(12) United States Patent
Baba

(10) Patent No.: US 11,080,480 B2
(45) Date of Patent: Aug. 3, 2021

(54) MATRIX GENERATION PROGRAM, MATRIX GENERATION APPARATUS, AND PLAGIARISM DETECTION PROGRAM

(71) Applicant: FUJITSU LIMITED, Kawasaki (JP)

(72) Inventor: Kensuke Baba, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 16/112,944

(22) Filed: Aug. 27, 2018

(65) Prior Publication Data
US 2019/0065443 A1  Feb. 28, 2019

(30) Foreign Application Priority Data
Aug. 29, 2017 (JP) .............................. JP2017-164553

(51) Int. Cl.
| | |
|---|---|
| *G06F 40/194* | (2020.01) |
| *G06F 17/14* | (2006.01) |
| *G06F 40/151* | (2020.01) |
| *G06F 40/129* | (2020.01) |

(52) U.S. Cl.
CPC .......... *G06F 40/194* (2020.01); *G06F 17/141* (2013.01); *G06F 40/151* (2020.01); *G06F 40/129* (2020.01)

(58) Field of Classification Search
CPC .... G06F 40/194; G06F 40/151; G06F 17/141; G06F 40/129
USPC .......................................................... 704/9
See application file for complete search history.

(56) References Cited

U.S. PATENT DOCUMENTS

| | | |
|---|---|---|
| 2005/0033523 A1 | 2/2005 | Abe et al. |
| 2013/0232162 A1 | 9/2013 | Tsuda |

FOREIGN PATENT DOCUMENTS

| | | |
|---|---|---|
| JP | 2004-046370 | 2/2004 |
| JP | 2010-231766 | 10/2010 |
| JP | 2012-252484 | 12/2012 |

OTHER PUBLICATIONS

M. J. Fischer et al., "String-Matching and Other Products", Complexity of Computation (Proceedings of the SIAM-AMS Applied Mathematics Symposium, New York, 1973), pp. 113-125, 1974 (13 pages).
D. Gusfield, "Algorithms on Strings, Trees and Sequences:Computer Science and Computational Biology", Cambridge University Press, 1997 (326 pages).

(Continued)

*Primary Examiner* — Thierry L Pham
(74) *Attorney, Agent, or Firm* — Fujitsu Patent Center

(57) ABSTRACT

A plagiarism detection program causing a computer to perform processing of: converting a target document into a first numerical matrix; generating a first conversion matrix by performing discrete Fourier transform on the first numerical matrix; generating a detection matrix which is used for plagiarism detection by masking a upper row of the first conversion matrix with 0; converting a query document into a second numerical matrix; generating a second conversion matrix by performing the discrete Fourier transform on the second numerical matrix; creating an element product matrix by multiplying each element of the second conversion matrix; and acquiring a vector relating to match between the target document and the query document by performing inverse discrete Fourier transform after elements of the created element product matrix are summed.

9 Claims, 28 Drawing Sheets

(56) References Cited

OTHER PUBLICATIONS

M. J. Atallah et al., "A Randomized Algorithm for Approximate String Matching", Algorithmica, 29, pp. 468-486, 2001 (19 pages).
K. Baba et al., "A Note on Randomized Algorithm for String Matching with Mismatches", Nordic Journal of Computing, 10(1), pp. 2-12, 2003 (11 pages).
T. Schoenmeyr et al. "FFT-based algorithms for the string matching with mismatches problem", Journal of Algorithms, 57, pp. 130-139, 2005 (10 pages).

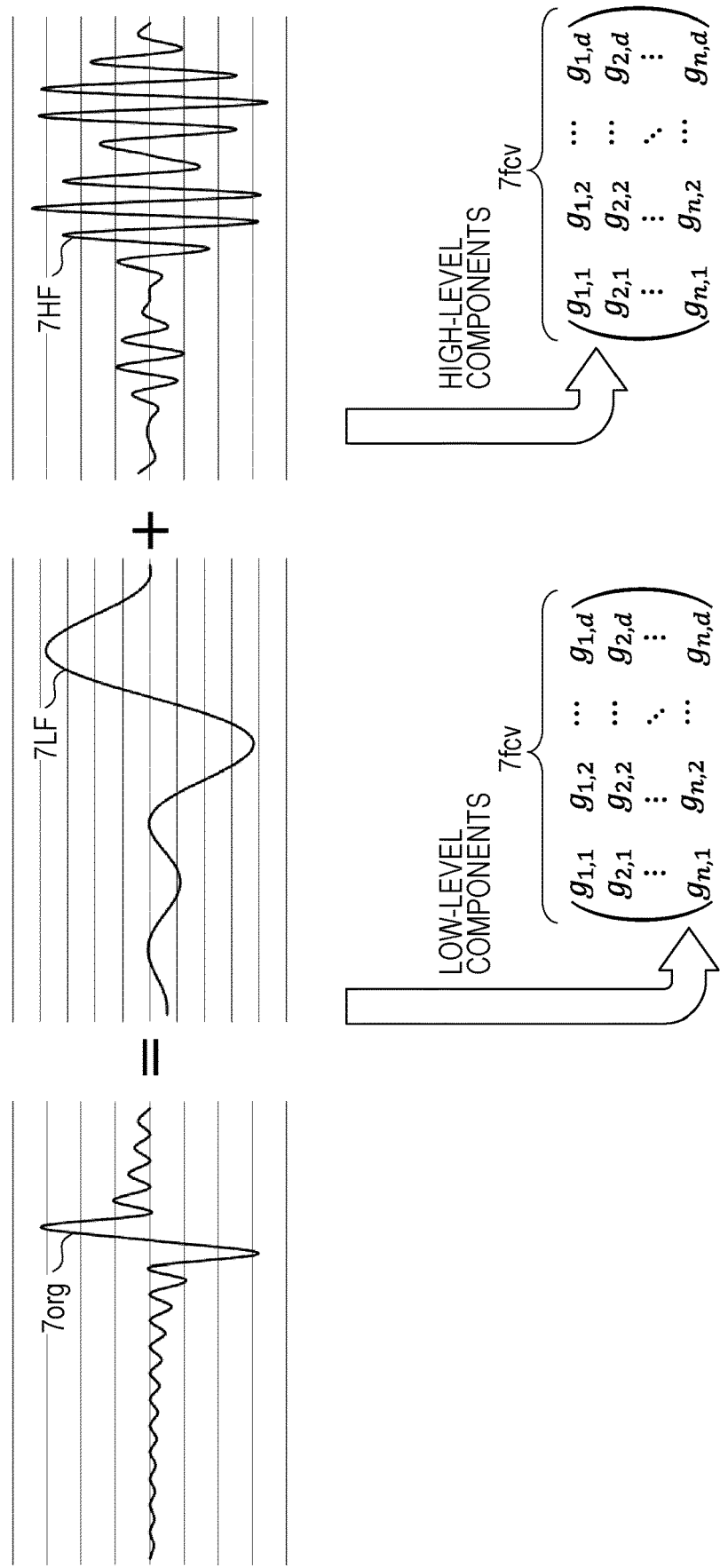

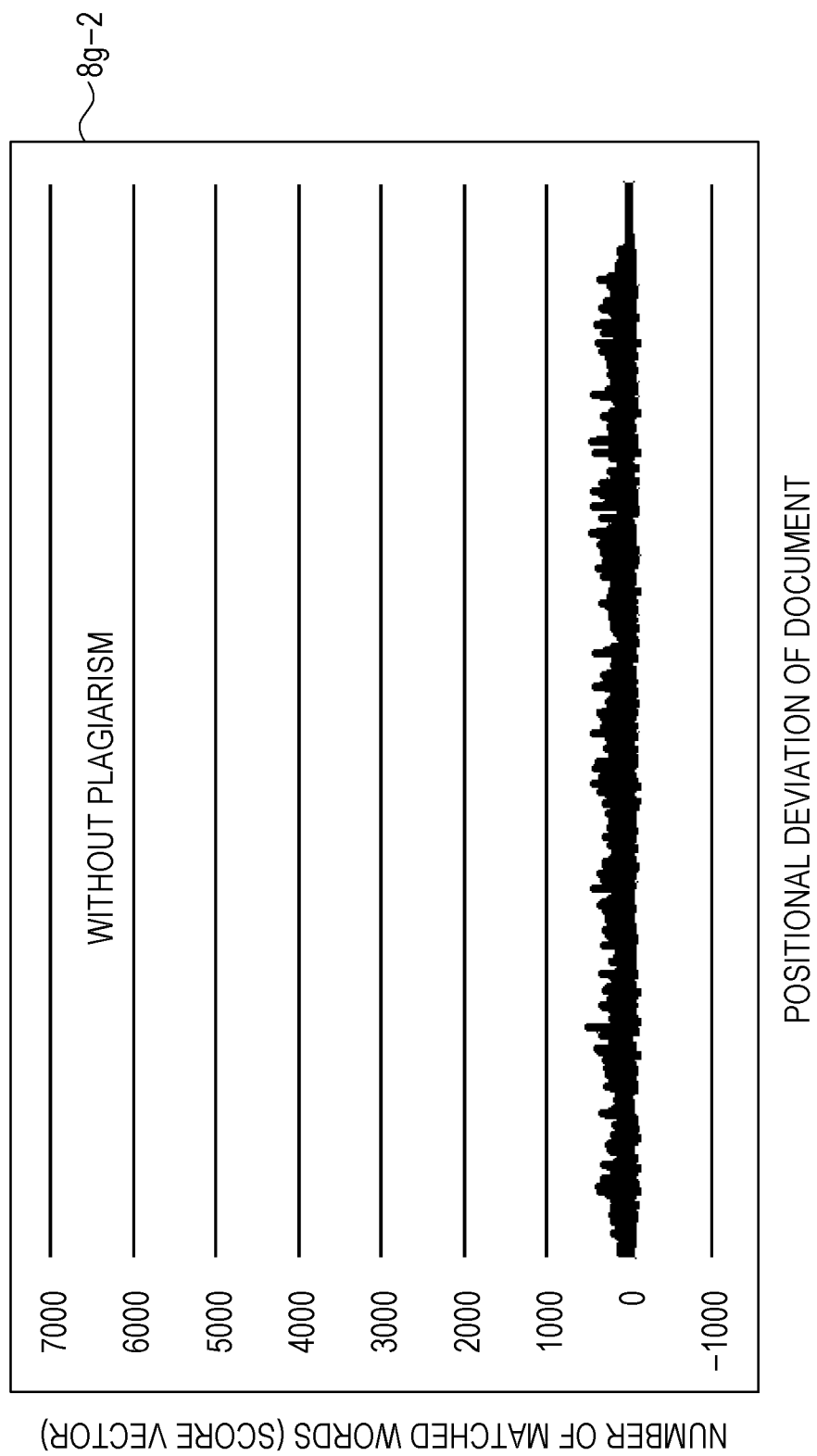

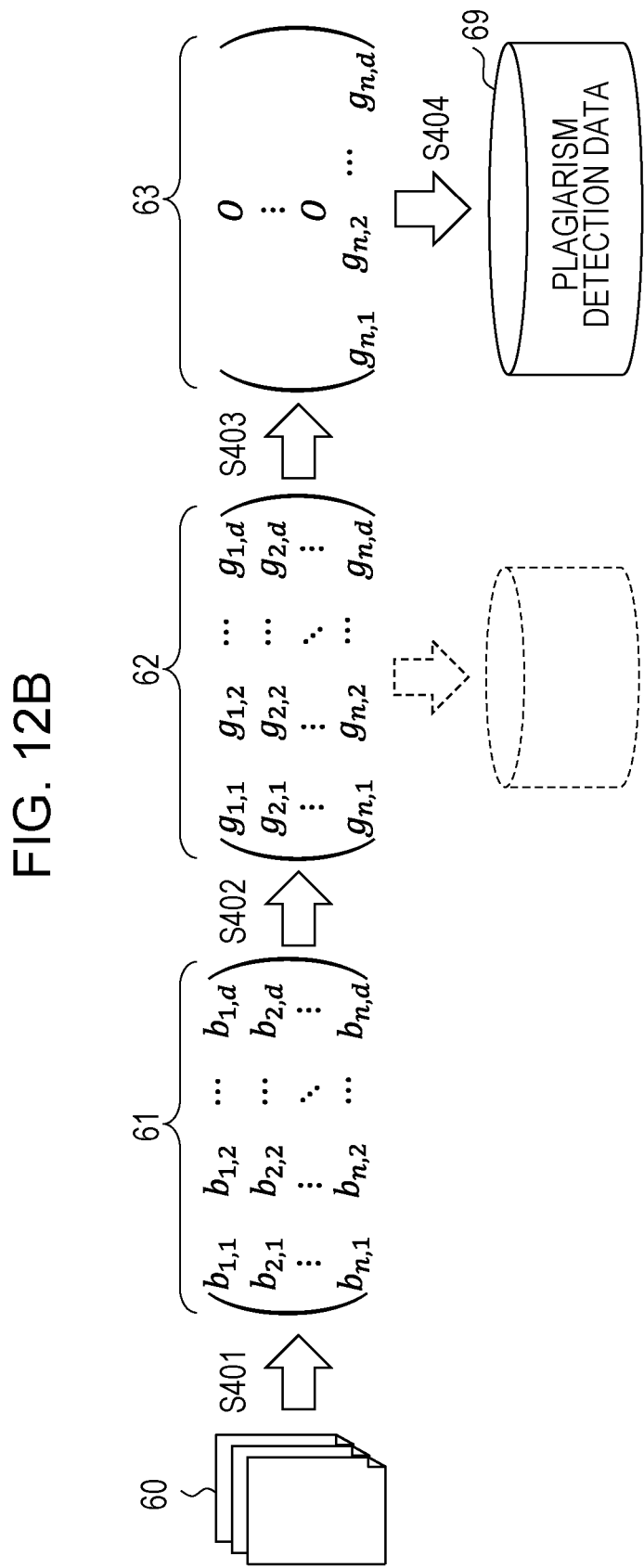

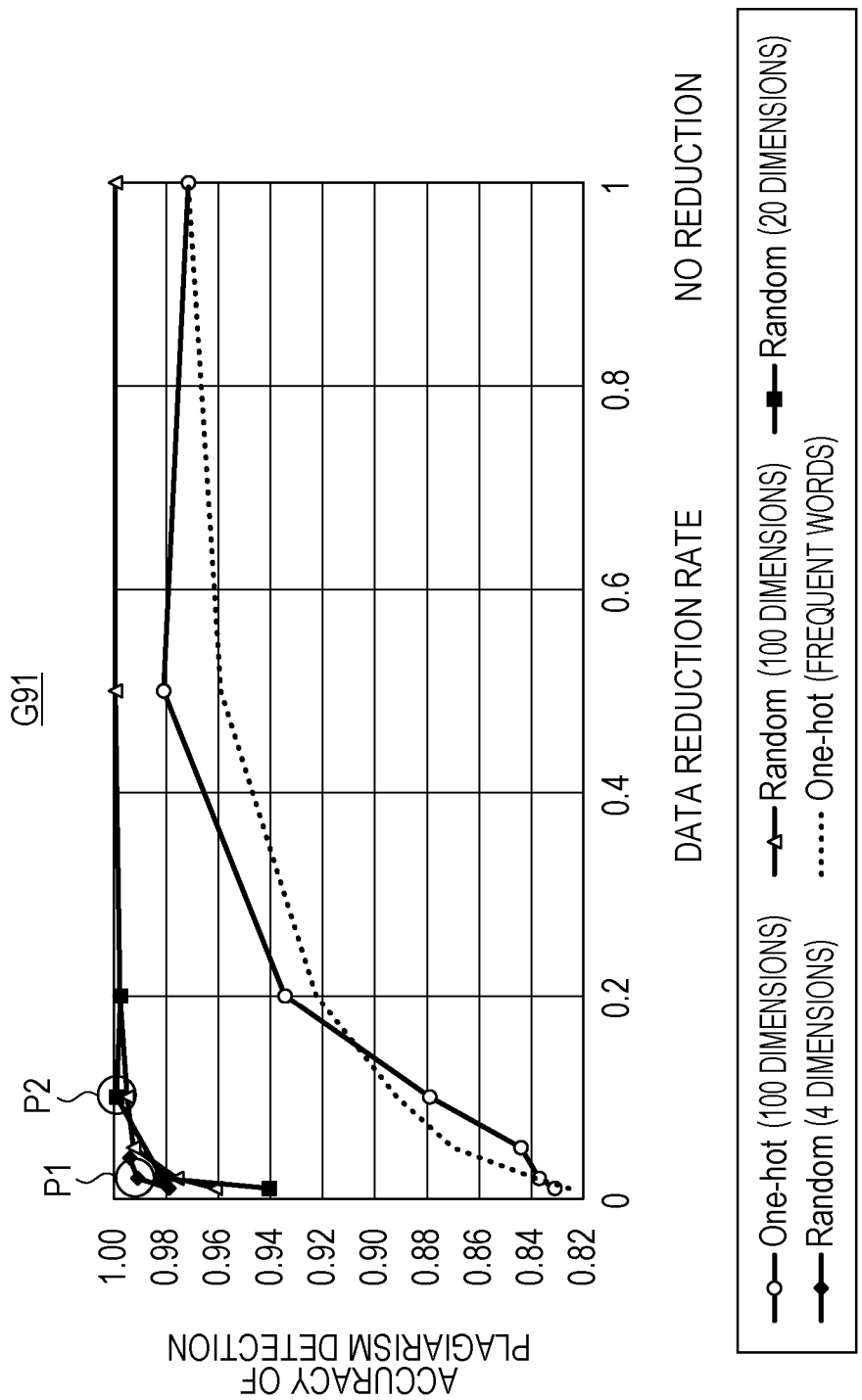

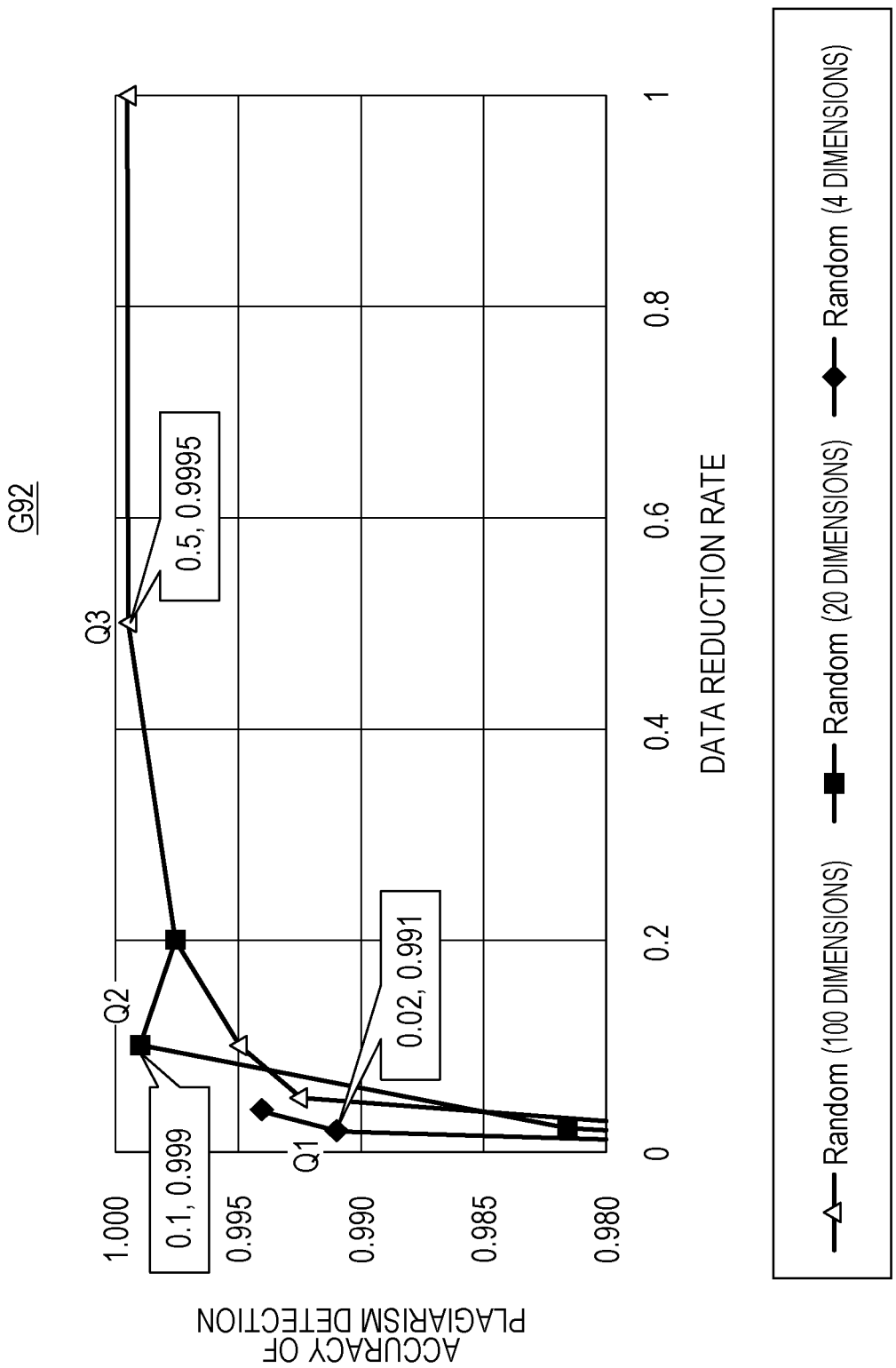

US 11,080,480 B2

MATRIX GENERATION PROGRAM, MATRIX GENERATION APPARATUS, AND PLAGIARISM DETECTION PROGRAM

CROSS-REFERENCE TO RELATED APPLICATION

This application is based upon and claims the benefit of priority of the prior Japanese Patent Application No. 2017-164553, filed on Aug. 29, 2017, the entire contents of which are incorporated herein by reference.

FIELD

The embodiments discussed herein are related to a matrix generation program, a matrix generation apparatus, and a plagiarism detection program for plagiarism detection.

BACKGROUND

Recently, comparison between documents has been performed, and thereby, similar portions are extracted. As one example, there is known a technique for making determination at high speed using a pair of hash values when similarity between the documents is determined by a pair of elements.

Japanese Laid-open Patent Publication No. 2010-231766, Japanese Laid-open Patent Publication No. 2004-46370, and Japanese Laid-open Patent Publication No. 2012-252484 are examples of the related art.

Followings are examples of non-patent literatures of the related art are;
- M. J. Fischer and M. S. Paterson: String-matching and other products, Complexity of Computation (Proceedings of the SIAM-AMS Applied Mathematics Symposium, New York, 1973), pp.113-125, 1974.
- D. Gusfield: Algorithms on Strings, Trees and Sequences: Computer Science and Computational Biology, Cambridge University Press, 1997.
- M. J. Atallah et al.: A randomized algorithm for approximate string matching. Algorithmica, 29: 468-486, 2001.
- K. Baba et al.: A Note on Randomized Algorithm for String Matching with Mismatches, Nordic Journal of Computing, 10 (1): 2-12, 2003.
- T. Schoenmeyr and D. Yu-Zhang: FFT-based Algorithms for the String Matching with Mismatches Problem, Journal of Algorithms, 57: 130-139, 2005.

With spread of a network and expansion of the Internet, the amount of electronic documents that are accessible online is increased. In particular, there is an increasing demand for plagiarism about academic papers, a copyrighted document, and the like, to be detected.

In general, predetermined processing is performed for many target documents which are sources of plagiarism, the documents are quantified to easily determine similarity, and the documents are stored as data representing a quantified matrix. In particular, with enormous existence of the target documents on the Internet at present, it is difficult to secure a storage region that sufficiently holds quantified data for the plagiarism detection.

Accordingly, in one aspect, it is an object to reduce the amount of data of detection matrix data.

SUMMARY

According to an aspect of the invention, a plagiarism detection program causing a computer to perform processing of: converting a target document into a first numerical matrix; generating a first conversion matrix by performing discrete Fourier transform on the first numerical matrix; generating a detection matrix which is used for plagiarism detection by masking a upper row of the first conversion matrix with 0; converting a query document into a second numerical matrix; generating a second conversion matrix by performing the discrete Fourier transform on the second numerical matrix; creating an element product matrix by multiplying each element of the second conversion matrix; and acquiring a vector relating to match between the target document and the query document by performing inverse discrete Fourier transform after elements of the created element product matrix are summed The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating synthesis and decomposition of waveforms;

FIGS. 9A and 9B are diagrams illustrating an example of an approximate score vector by masking in a case where there is no plagiarism;

FIGS. 12A and 12B are diagrams illustrating detection data generation processing of the first functional configuration example of FIG. 11;

FIG. 14 is a diagram illustrating a relationship between a data removal rate and accuracy of the plagiarism detection;

FIG. 18 is a diagram illustrating a relationship between an experimental result and condition setting;

DESCRIPTION OF EMBODIMENTS

Hereinafter, embodiments will be described with reference to the drawings. First of all, situations assuming formulation of problems relating to plagiarism detection of a document are follows.

First Situation

In detection of plagiarism of a document, not an illegal use of general content or logic but an illegal use of an appearance of letters becomes a target. There should be little room for realistic determination of plagiarism to depend on a situation, and it is particularly desirable to be able to detect strictly.

Second Situation

Without designating a suspicious sentence or a phrase in an input document (corresponding to a query document 70 to be described below) for detecting plagiarism, the entire document is comprehensively examined. Even in a case where there is no additional information serving as a clue to detect the plagiarism, it is possible to detect the plagiarism.

Third Situation

A sentence (corresponding to a target document 60 to be described below) which may be the source of plagiarism is given in advance and preprocessing is performed for the sentence. In an actual operation, data relating to the target document 60 may be held as a database (corresponding to plagiarism detection data 69 to be described below).

Figure 1:
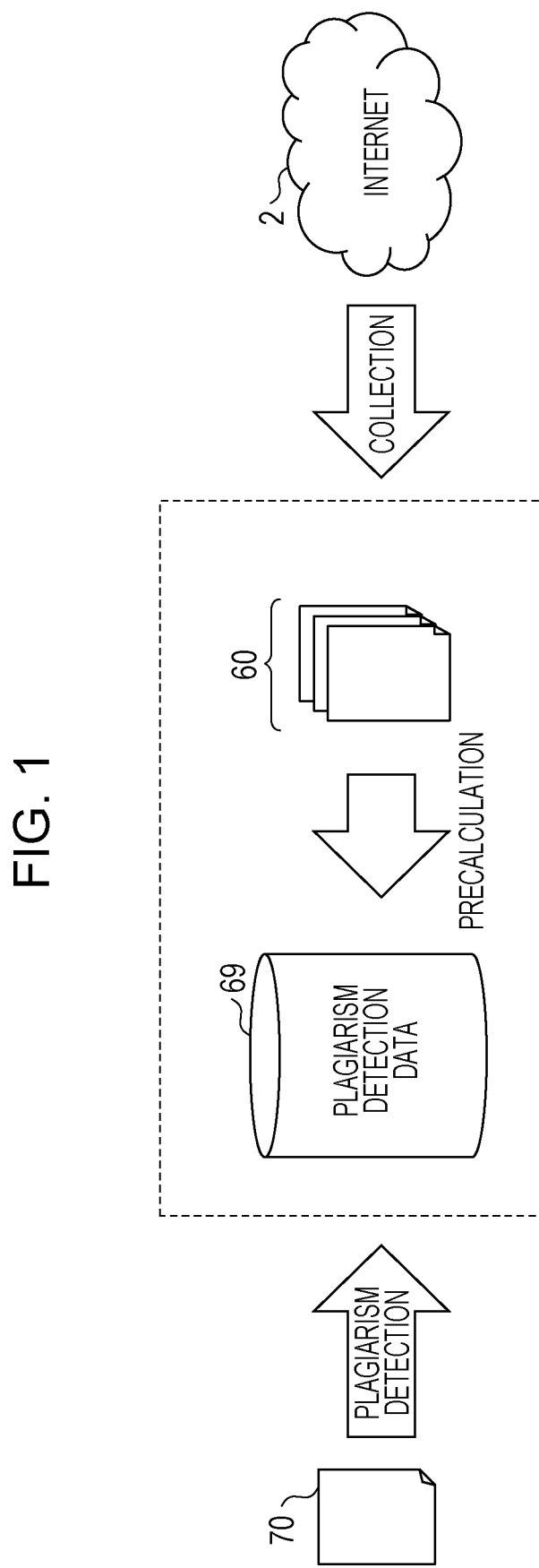
FIG. 1 is a diagram illustrating an overview of plagiarism detection of a document.

FIG. 1 is a diagram illustrating an overview of plagiarism detection of a document. In FIG. 1, in order to detect plagiarism of the document, a plurality of target documents 60 which is a source of the plagiarism are collected from the Internet 2, and pre-calculated. In the pre-calculation, each target document 60 is converted into a numerical matrix and discrete Fourier transform is performed for each target document. Post-conversion matrix data obtained by the pre-calculation is accumulated in a plagiarism detection data 69.

The query document 70 is a sentence in which whether or not a document contains a plagiarized part from an existing document is determined. Also for the query document 70, the same processing as the pre-calculation for the target document 60 is performed to acquire the post-conversion matrix data. Plagiarism is detected with reference to the post-conversion matrix data of the query document 70 and the plagiarism detection data 69, using the post-conversion matrix data of each of the plurality of target documents 60.

Next, an index for plagiarism detection for the query document 70 will be described. Problems (for example, a match count problem, and the like) of examining the number of matched words are used for all positional deviations between the query document 70 and the target document 60. Using this problem, the following features appear.

An output is a vector. (analysis for determination of plagiarism can be made by using a vector)

A suspicious part of the query document 70 need not be specified.

Not an absolute value of the number of matched words at each positional deviation but a relative value for the entire distribution can be considered.

Then, in a case of a problem of simply obtaining appearance of the query document 70 in the target document 60, An output is an appearance position. (Assuming that some knowledge about plagiarism is previously used)

Accurate specification of a plagiaristic portion is demanded for searching for strict appearance.

Search of approximate appearance can be done at high speed given a threshold, but only an absolute value can be considered.

Figure 2:
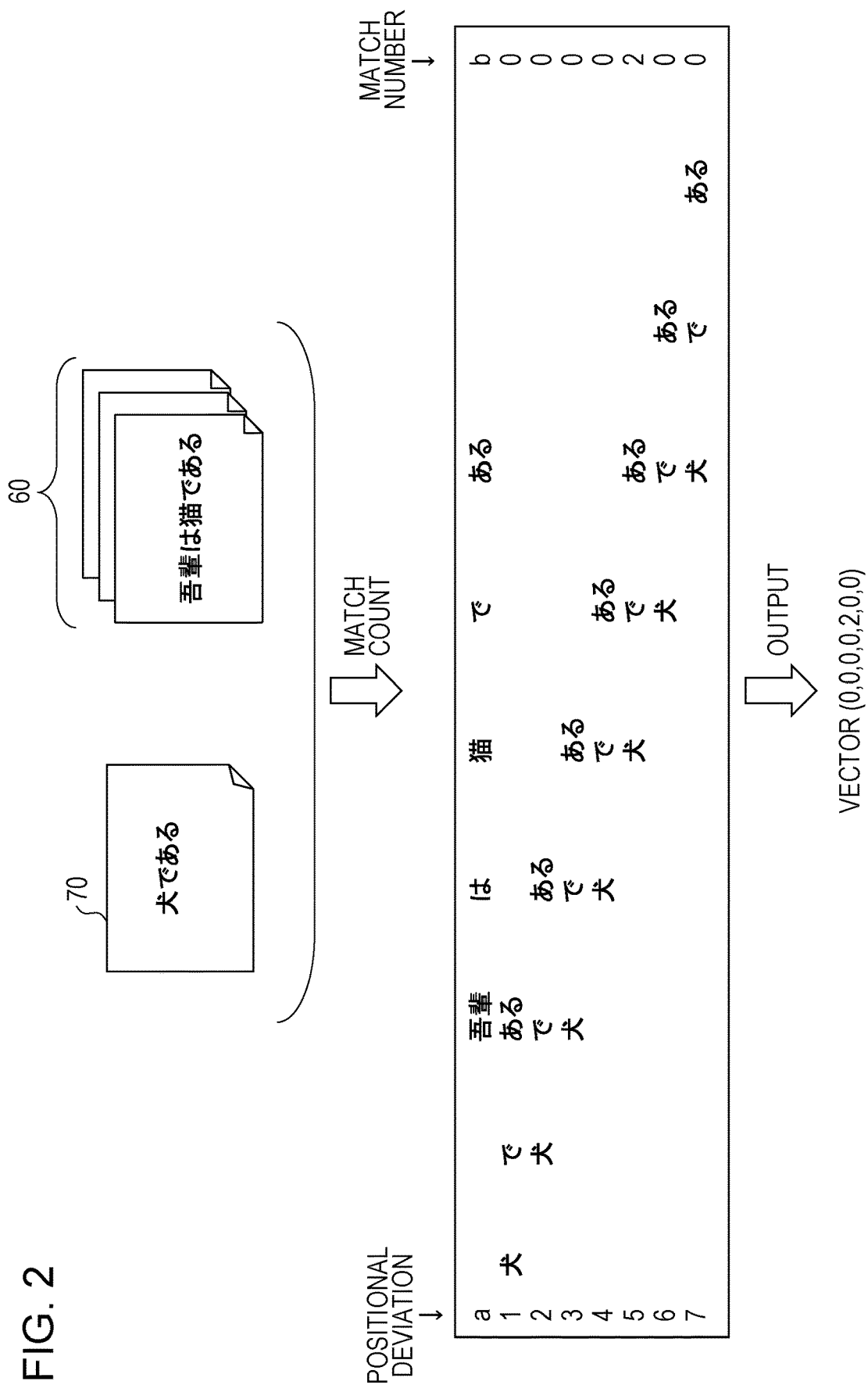
FIG. 2 is a diagram illustrating an example of a match count problem.

With respect to the above-described match count problem, a case where the query document 70 is 「犬である」 (meaning "it is a dog") and the target document 60 is 「吾輩は猫である」 (meaning "I am a cat"). FIG. 2 is a diagram illustrating an example of the match count problem. In FIG. 2, the target document 60 overlaps by being shifted for each word from the word at the end of the query document 70. The deviation for each word is specified by a positional deviation a, and the number of matched words is indicated by a match number b. An output of this example is a vector (0, 0, 0, 0, 2, 0, 0) indicating the number of matches b in the order of the positional deviation a. Such a vector is called a score vector.

As a method of solving the match count problem, it is desirable to quantify the target document 60 and the query document 70 and perform a convolution operation. This method has the following features.

It is the fastest among the methods of solving the match count problem. (Processing times for documents of a length (number of words) n are each 0 (n log n) time)

The amount of calculation increases in proportion to the amount of the target documents 60. In a case of the assumed third situation, it is an effective solution to perform part of the calculation on the target document 60 in advance.

The problem is that the amount of data in the intermediate state of calculation increases and it may be difficult to hold the results of the pre-calculation.

Figure 3:
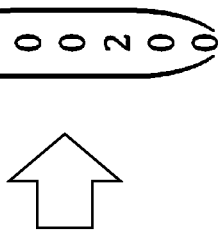
FIGS. 3A to 3C are diagrams illustrating the amount of data in an intermediate state of pre-calculation.

The amount of data in an intermediate state by quantification of a sentence and a convolution operation will be described. FIGS. 3A to 3C are diagrams illustrating the amount of data in the intermediate state of the pre-calculation. In FIGS. 3A to 3C, it is assumed that the query document 70 is 「犬である」 (meaning "it is a dog") and the target document 60 is 「吾輩は猫である」 (meaning "I am a cat"). FIG. 3A illustrates an example of numerical vector generation of a document, FIG. 3B illustrates an example of a convolution operation, and FIG. 3C illustrates an example of the number of matched words.

In the numerical vector generation of FIG. 3A, vectors are generated by the number of words for each document. In this example, since the number of words of the query document 70 is 3, the query document is represented by three vectors. Since the number of words of the target document 60 is 5, target document is represented by five vectors.

Here, simply, a dimension number is set to "5" based on the total number of words included in at least one of the query document 70 and the target document 60. Specifically, words obtained from the query document 70 and the target document 60 are six items of 「犬」 (meaning "dog"), 「で」

(meaning "am/is"), 「ある」 (meaning "am/is"), 「答兼」 (means "I"), 「は」 (meaning "am/is"), and 「猫」 (meaning "cat"), but the document may be expressed in a five-dimension by assigning a certain word (「犬」 in this example) to a vector of all zeros (0, 0, 0, 0, 0).

Thus, in a step of the numerical vector generation in FIG. 3A, a region several times the dimension number of the vector expression of the word is used. In the case of a simple expression, the dimension number corresponds to the number of words.

In the convolution operation of FIG. 3B, convolution operations of the query document 70 and the target document 60 are performed by using the positional deviation a (FIG. 2) as the number of rows and using a dimension number at the stage of numerical vector generation in FIG. 3A as the number of columns. First, one matrix is inverted with respect to a row and a lower row is padded with zeros so as to make the two matrices match the number of rows of the positional deviation a.

In this example, a position (row) of the vector of the query document 70 is inverted upside down in the query document matrix 71a, and the convolution operation is performed on the query document matrix 71a in which the lower row is padded with zeros and a target document matrix 61a of the target document 60 in which only padding is performed. The query document matrix 71a expresses the query document 70 as a matrix and the target document matrix 61a expresses the target document 60 as a matrix.

In the convolution operation,
(1) Discrete Fourier transform (DFT) of two matrices 71a and 61a
(2) multiplication by each element (product)
(3) inverse discrete Fourier transform (inverse DFT) is performed. However, if transform satisfying the convolution theorem is performed, calculation other than the discrete Fourier transform may be performed. By performing the convolution operation, a matrix 74a is obtained. In the matrix 74a, a matching portion of words for each positional deviation "a" is represented by In word match number calculation illustrated in FIG. 3C, elements are added for each row of a matrix 74a in FIG. 3B to obtain a vector 79a of 1 row×1 column. The obtained vector 79a corresponds to the match number b in FIG. 2. In this example, a fifth positional deviation indicates that two words match each other. Referring to FIG. 2, at the two words 「で」 and 「ある」, the fifth positional deviation matches with the target document 60.

In the above-described pre-calculation, the amount of data in an intermediate state is increased to approximately four times by the padding for creating the query document matrix 71a and the target document 60, and the convolution operation including the discrete Fourier transform. For a plurality of target documents 60, each target document matrix 61a is held in the plagiarism detection data 69 (FIG. 1). The larger the number of words increases, the amount of data of the target document matrix 61a increases. In the present embodiment, the amount of data of the target document matrix 61a which is held is reduced.

Figure 4:
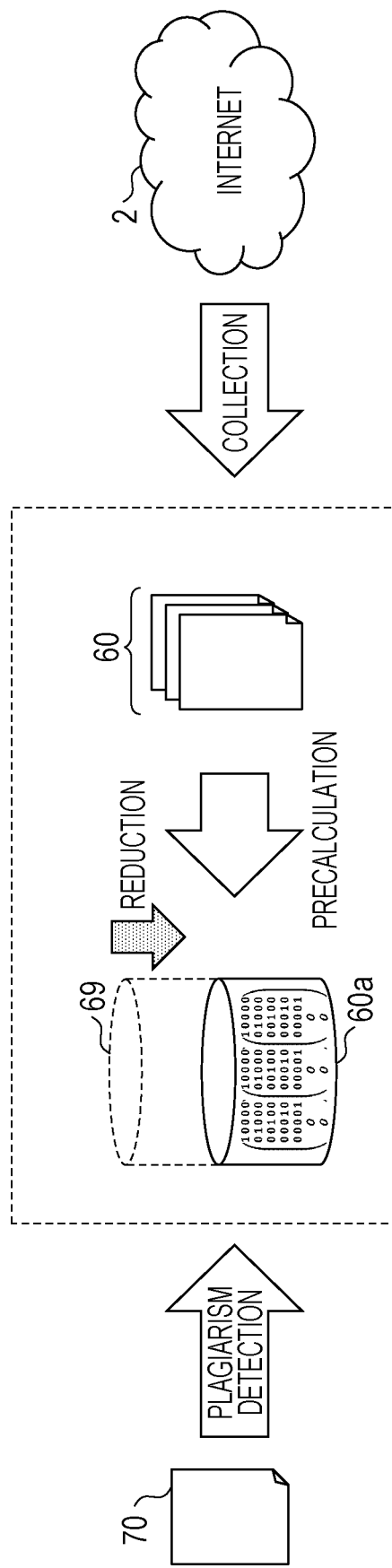
FIG. 4 is a diagram illustrating reduction in the amount of data held for the plagiarism detection according to the present embodiment.

FIG. 4 is a diagram illustrating reduction in the amount of data held for plagiarism detection according to the present embodiment. In FIG. 4, in the present embodiment, by reducing data representing the target document matrix 61a obtained from the target document 60 without degrading accuracy of the plagiarism detection, the amount of data of the plagiarism detection data 69 is reduced.

Figure 5:
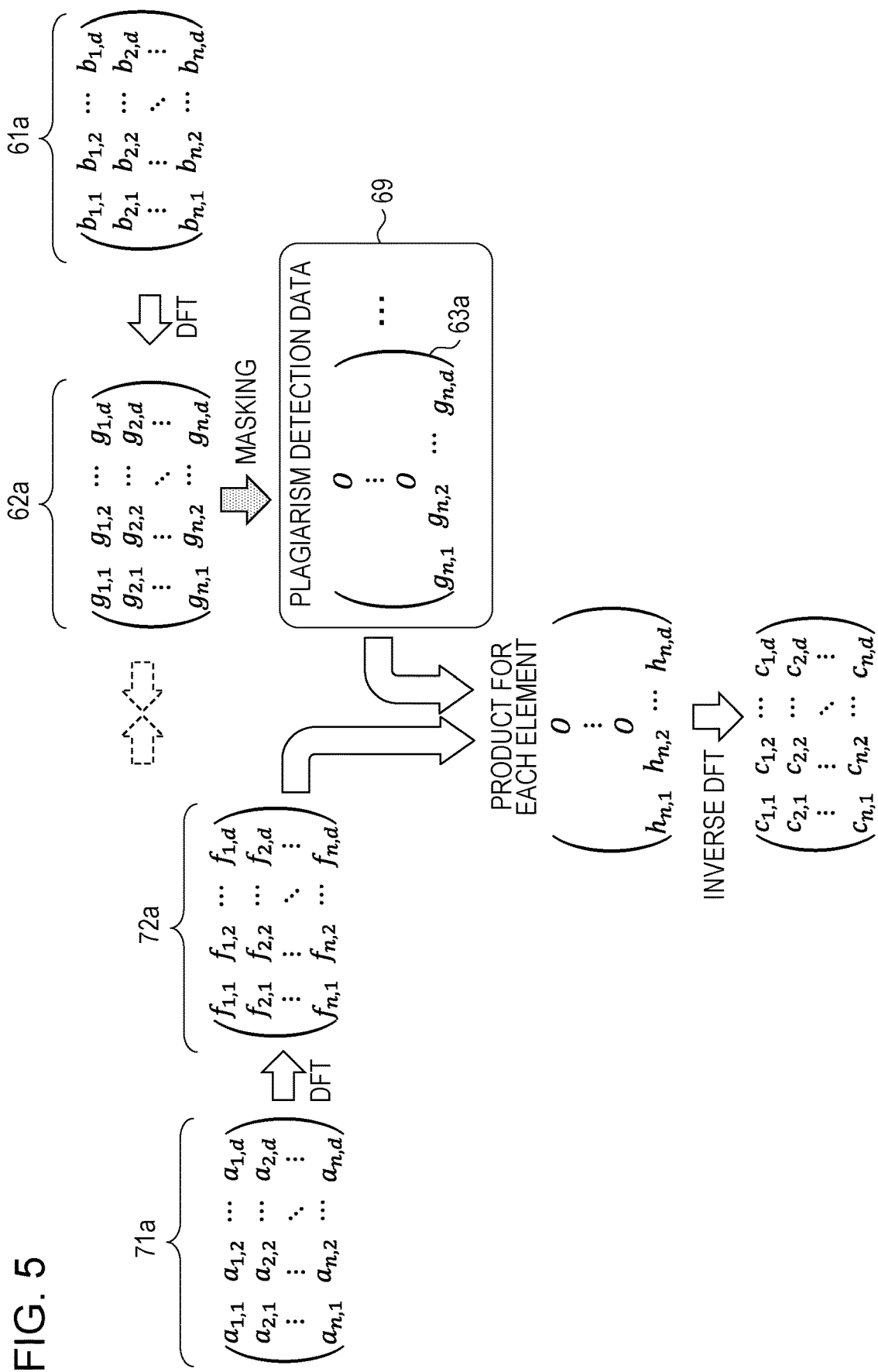
FIG. 5 is a diagram illustrating an overview of overall processing relating to the plagiarism detection according to the present embodiment.

FIG. 5 is a diagram illustrating an overview of the entire processing relating to plagiarism detection according to the present embodiment. According to FIG. 5, in the present embodiment, one or multiple rows of the post-conversion target document matrix 62a obtained by performing the discrete Fourier transform on the target document matrix 61a are all masked with 0 to be set to plagiarism detection data 69. By setting to 0 on a row basis, it is possible to obtain a reduction matrix 63a in which the amount of data is reduced. The reduction matrix 63a in which the amount of data is reduced is held as the plagiarism detection data 69.

A discrete Fourier transform is performed on the query document matrix 71a to obtain the post-conversion query document matrix 72a. In the present embodiment, a calculation sequence in the existing convolution operation is changed to obtain product (inner product) for each element by the post-conversion query document matrix 72a and the reduction matrix 63a of the previously prepared plagiarism detection data 69, and thereafter, inverse discrete Fourier transform is performed. By adopting the calculation sequence, processing time can be shortened.

Calculation is represented as follows, based on the above-described content.
A: matrix expression of query document
B: matrix expression of target document
F: matrix in which discrete Fourier transform is performed
M·N: matrix obtained by product for each element of matrix M and matrix N
$M_c$: vector obtained by addition for each row of matrix M
$M_m$: matrix in which higher row of matrix M is masked
The score vector $C_c$ is obtained by following formula.

$$C_c = F^{-1}(FA \cdot FB)$$

In the present embodiment, $C_c'$ is calculated by following formula as an approximate value of the score vector $C_c$.

$$C_c' = F^{-1}(FA \cdot (FB)_m)$$

If (i, j) element of $(FB)_m$ is 0, (i, j) element of following formula is 0, and thus, multiplication can be omitted according to a masking range.

$$FA \cdot (FB)_m$$

Figure 6:
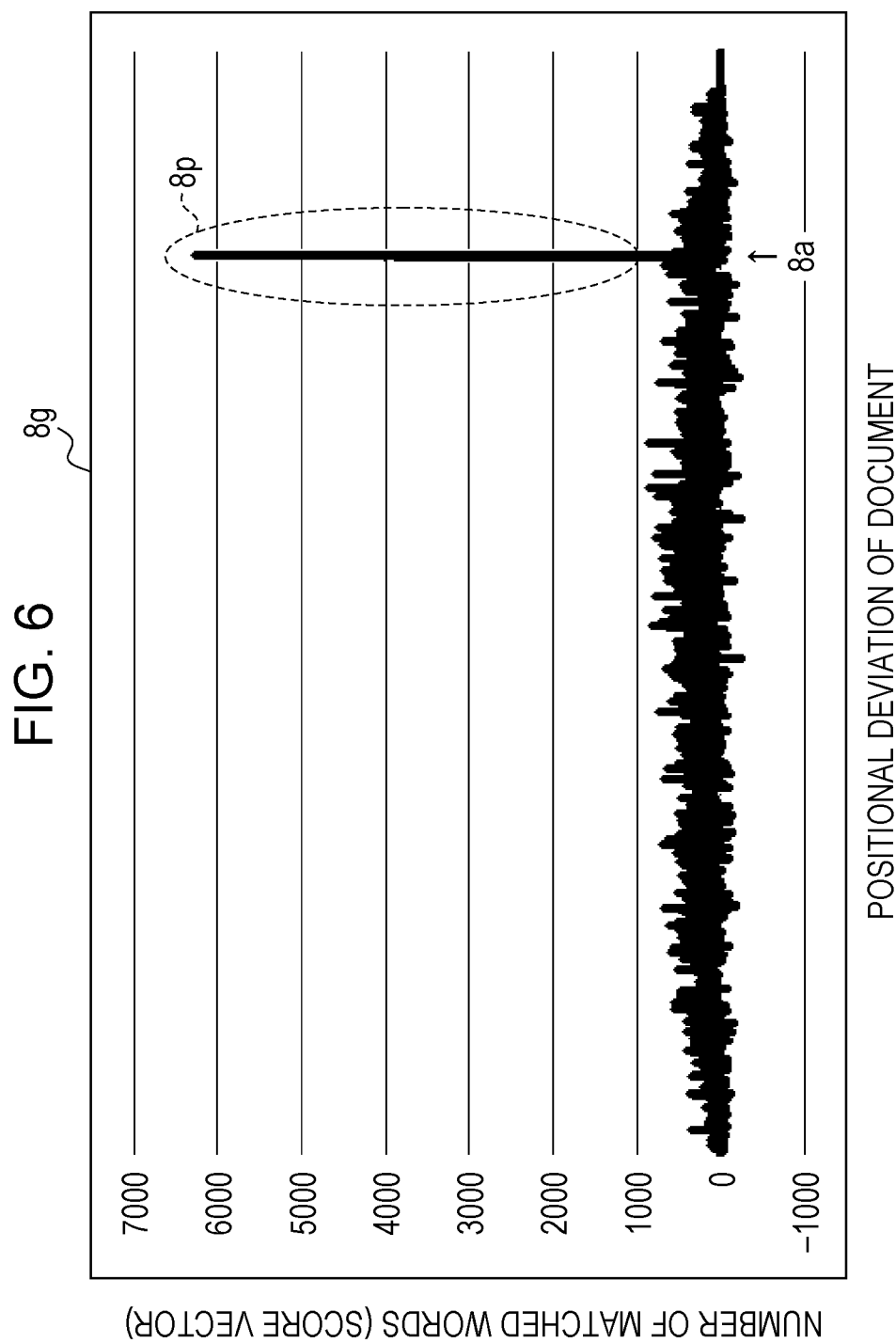
FIG. 6 is a diagram illustrating an example of a score vector in a case of plagiarism.

Next, the masking of rows of the post-conversion target document matrix 62a will be described with reference to FIGS. 6 to 9B. FIG. 6 is a diagram illustrating an example of a score vector in a case where there is plagiarism. In FIG. 6, a vertical axis denotes the number of matched words (score vector) and a horizontal axis denotes a positional deviation of a document. Hereinafter, a graph illustrated in FIG. 6 is simply referred to as a score vector 8g.

The query document 70 indicates a peak 8p projected by the positional deviation 8a with respect to the target document 60. That is, at the time of the positional deviation 8a, the query document 70 is very similar to the target document 60, which indicates that there is a possibility of plagiarism. In addition, simply obtaining a result representing only presence or absence of the peak 8p may be effective in some cases. In that case, an exact solution of the score vector may not be made.

The inventor analyzes a waveform representing the number of matched words for each positional deviation of sentences as follows. First, considering synthesis and decomposition of waveforms, the waveforms are simply illustrated as FIG. 7.

FIG. 7 is a diagram illustrating synthesis and decomposition of waveforms. In FIG. 7, an original waveform 7org is represented by a synthesis of low frequency components 7LF and high frequency components 7HF. In other words, the original waveform 7org is decomposed into the low frequency components 7LF and the high frequency components 7HF.

The low frequency components 7LF represent a global change, and the high frequency components 7HF represent a local change. In addition, the low frequency components 7LF correspond to low-level components of a Fourier transform destination, and the high frequency components 7HF correspond to high-level components of the Fourier transform destination. As compared with the high frequency components 7HF, a rough shape of the original waveform 7org remains in the low frequency components 7LF, and thereby, information of the peak 8p easily remains.

The inventor focused on specifying the low frequency components 7LF to verify the low frequency components 7LF and the high frequency components 7HF whether or not there is plagiarism, and obtained results as illustrated in FIGS. 8A to 9B. In the verification, a case where the plagiarism verification was performed by leaving low-level components of 10% and 1% by masking the post-conversion target document matrix 62a obtained by performing the discrete Fourier transform of the target document 60 was compared with a case where plagiarism verification was performed by leaving high-level components of 10% and 1% by masking the plagiarism detection data 69.

Figure 8A:
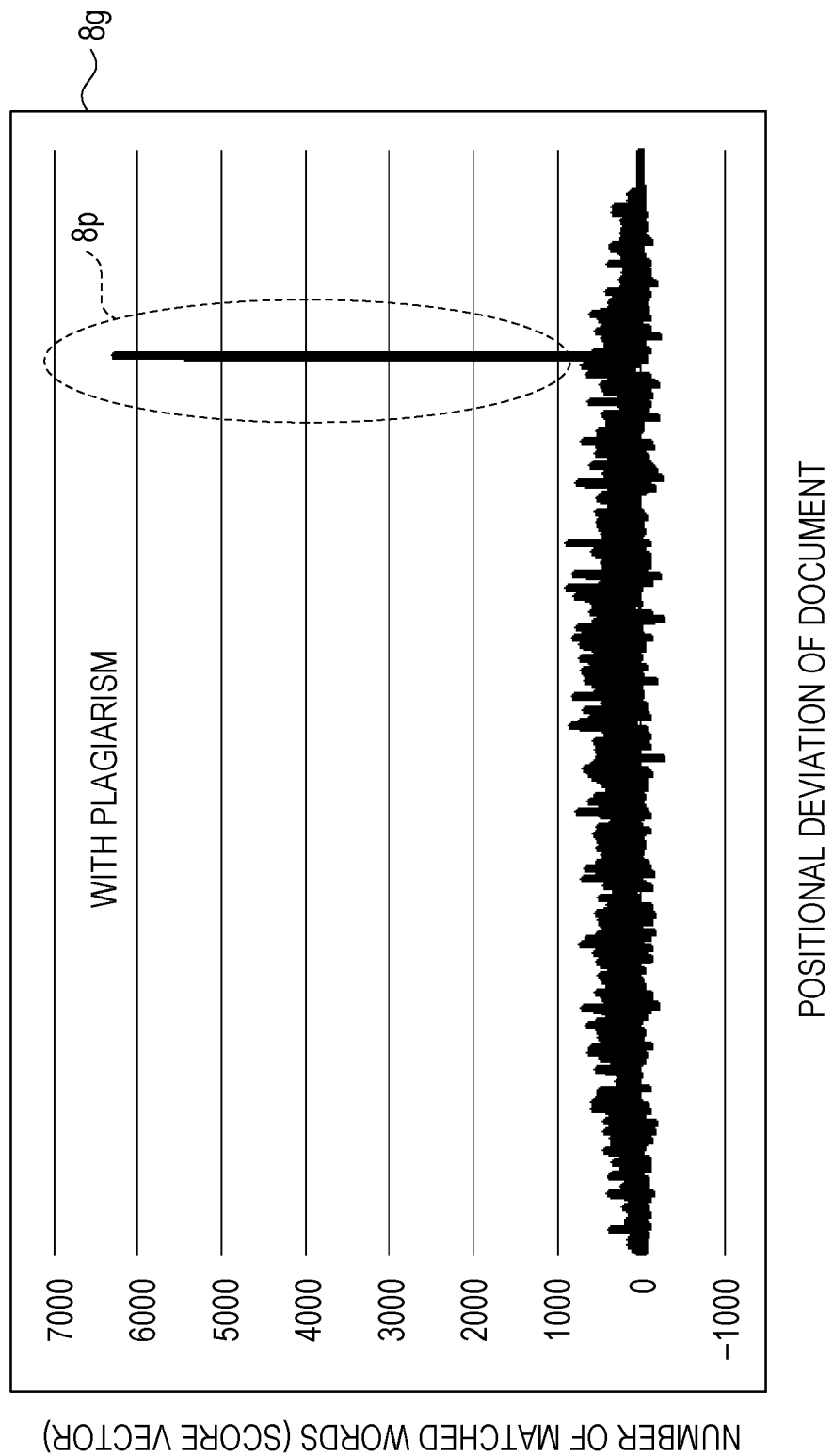
FIGS. 8A and 8B are diagrams illustrating an example of an approximate score vector by masking in a case where there is plagiarism.
Figure 8B:
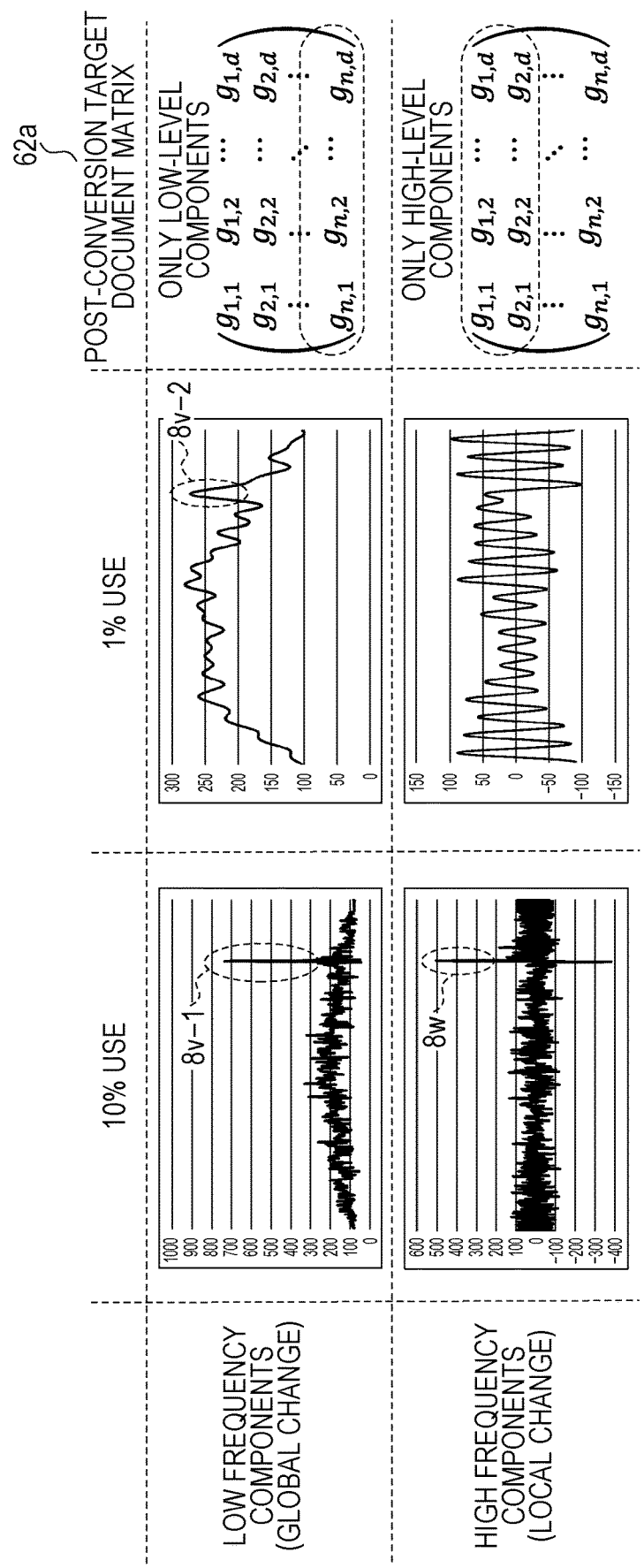

FIGS. 8A and 8B are diagrams illustrating an example of an approximate score vector according to masking in a case where there is plagiarism. FIG. 8A illustrates the score vector 8g having the same plagiarism as in FIG. 6 and representing the peak 8p.

In FIG. 8B, an approximate score vector in a case where only the low-level components of the post-conversion target document matrix 62a are used is illustrated in an upper stage, and an approximate score vector in a case where only the high-level components are used is illustrated in a lower stage. The two score vectors illustrate two cases where 10% is used and 1% is used, respectively.

In a case where only the low frequency components are left, when both 10% and 1% of the low-level components of the post-conversion target document matrix 62a are used, a peak 8v-1 and a peak 8v-2 are left in the same positional deviation. Determination whether or not there is plagiarism is sufficiently made. Meanwhile, in a case where only the high frequency components are left, when 10% of the high-level components of the post-conversion target document matrix 62a is used, a peak 8w is left, but when 1% thereof is used, it is difficult to determine the peak.

Thus, it is possible to sufficiently determine that there is plagiarism by using only the low frequency component, that is, only the low-level components of the post-conversion target document matrix 62a. Next, results of verification will be described in a case where there is no plagiarism.

Figure 9B:
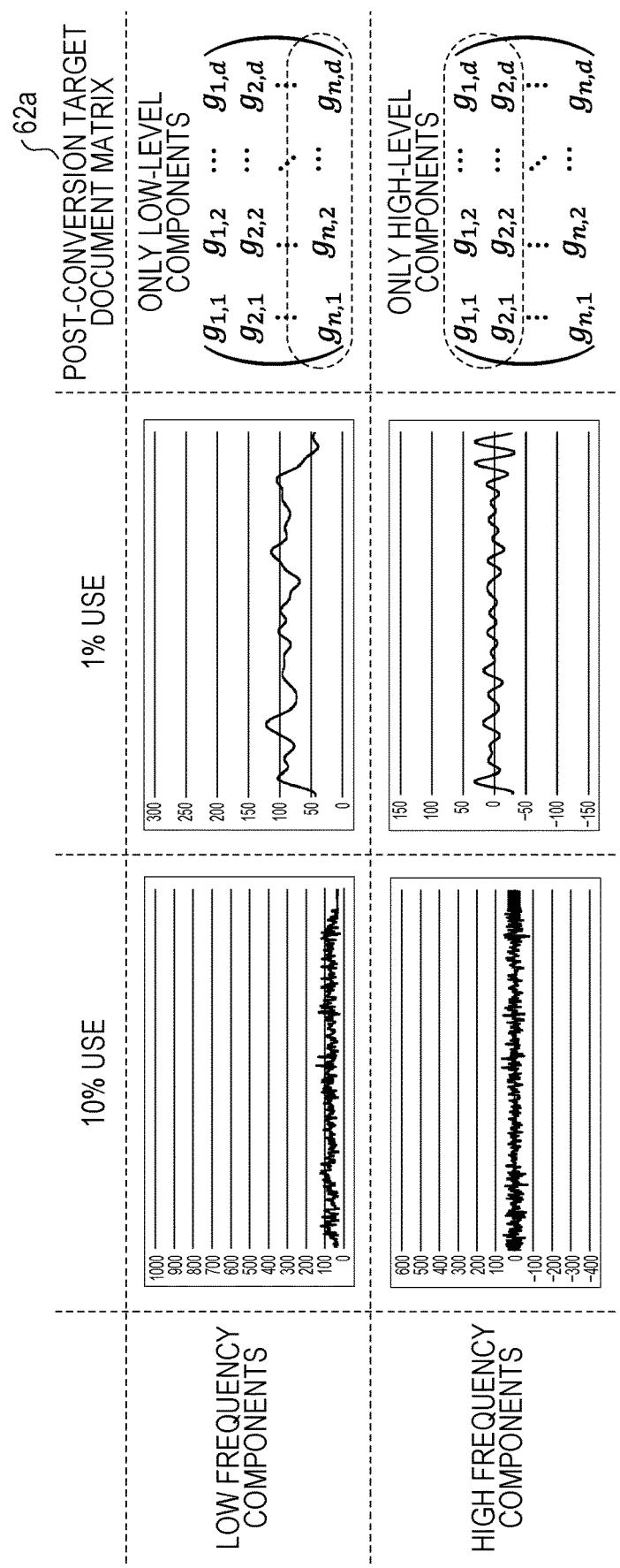

FIGS. 9A and 9B are diagrams illustrating an example of an approximate score vector according to masking in a case where there is no plagiarism. FIG. 9A illustrates a score vector 8g-2 in a case where there is no plagiarism. In the score vector 8g-2, peaks do not exist in all the positional deviations.

In FIG. 9B, an approximate score vector in a case where only the low-level components of the post-conversion target document matrix 62a are used is illustrated in an upper stage, and an approximate score vector in a case where only the high-level components are used is illustrated in a lower stage. The two score vectors illustrate two cases where 10% is used and 1% is used, respectively In a case where only the low frequency components are left, when both 10% and 1% of the low-level components of the post-conversion target document matrix 62a are used, a peak does not appear in all the positional deviations. In addition, a peak does not appear in all the positional deviations in the same manner as in a case where only the high frequency components are left.

From the verification of masking described above, it can be seen that whether or not there is plagiarism can be sufficiently determined with high accuracy only by the low-level components of the post-conversion target document matrix 62a. In addition, since whether or not there is plagiarism can be determined even at the time of using 1% in the low-level components, the inventor found that the amount of data can be reduced more in a case where only the low-level components of the post-conversion target document matrix 62a are used, than in a case where only the high-level components are used.

In the present embodiment, a generation apparatus 100 (FIG. 10) that performs detection data generation processing of generating the plagiarism detection data 69 with the reduced data amount and plagiarism detection processing using the plagiarism detection data 69. The generation apparatus 100 according to the present embodiment has a hardware configuration illustrated in FIG. 10.

Figure 10:
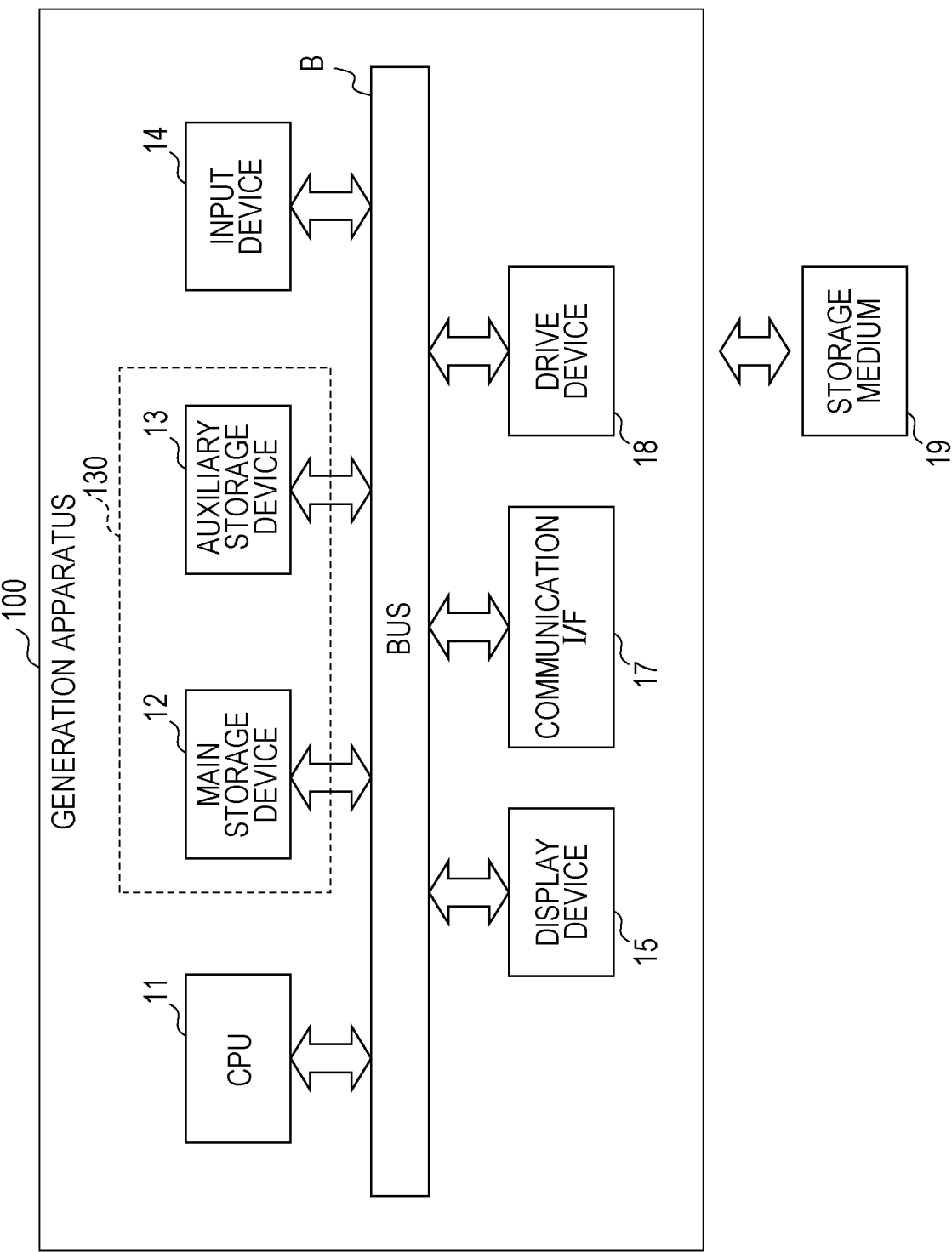
FIG. 10 is a diagram illustrating a hardware configuration of a generation apparatus.

FIG. 10 is a diagram illustrating a hardware configuration of the generation apparatus. In FIG. 10, the generation apparatus 100 is an information processing device controlled by a computer, includes a central processing unit (CPU) 11, a main storage device 12, an auxiliary storage device 13, an input device 14, a display device 15, a communication interface (I/F) 17, and a drive device 18, and is connected to a bus B.

The CPU 11 corresponds to a processor that controls the generation apparatus 100 according to a program stored in the main storage device 12. A random access memory (RAM), a read only memory (ROM), or the like is used as the main storage device 12, and the main storage device stores a program executed by the CPU 11, data demanded for being processed in the CPU 11, data obtained by processing in the CPU 11, and the like.

A hard disk drive (HDD) or the like is used as the auxiliary storage device 13, and data such as a program for executing various processes is stored in the auxiliary storage device 13. A part of the programs stored in the auxiliary storage device 13 is installed in the main storage device 12 and is executed by the CPU 11 to perform various processes. The main storage device 12, the auxiliary storage device 13, an external storage device which can be accessed via a network, and the like are collectively referred to as a storage unit 130.

The input device 14 includes a mouse, a keyboard, and the like, and is used by a user to input various kinds of information demanded for processing of the generation apparatus 100. The display device 15 displays kinds of information demanded for a control of the CPU 11. The input device 14 and the display device 15 may be a user interface configured with an integrated touch panel or the like. The communication I/F 17 performs communication through a network in a wired or wireless manner. Communication performed by the communication I/F 17 is not limited to the wireless or wired manner.

A program of realizing processing performed by the generation apparatus 100 is provided to the generation apparatus 100 by a storage medium 19 such as a compact disc read-only memory (CD-ROM).

The drive device 18 performs interfacing between the storage medium 19 (for example, a CD-ROM or the like) set in the drive device 18 and the generation apparatus 100.

A program of realizing various kinds of processing according to the present embodiment which will be described below is stored in the storage medium 19, and the program stored in the storage medium 19 is installed in the generation apparatus 100 via the drive device 18. The installed program can be executed by the generation apparatus 100.

The storage medium 19 that stores a program is not limited to the CD-ROM, and may be one or more non-transitory tangible medium having a computer readable data structure. In addition to the CD-ROM, a portable recording medium such as a digital versatile disk (DVD) or a USB memory, or a semiconductor memory such as a flash memory may be used as the computer readable storage medium.

Figure 11:
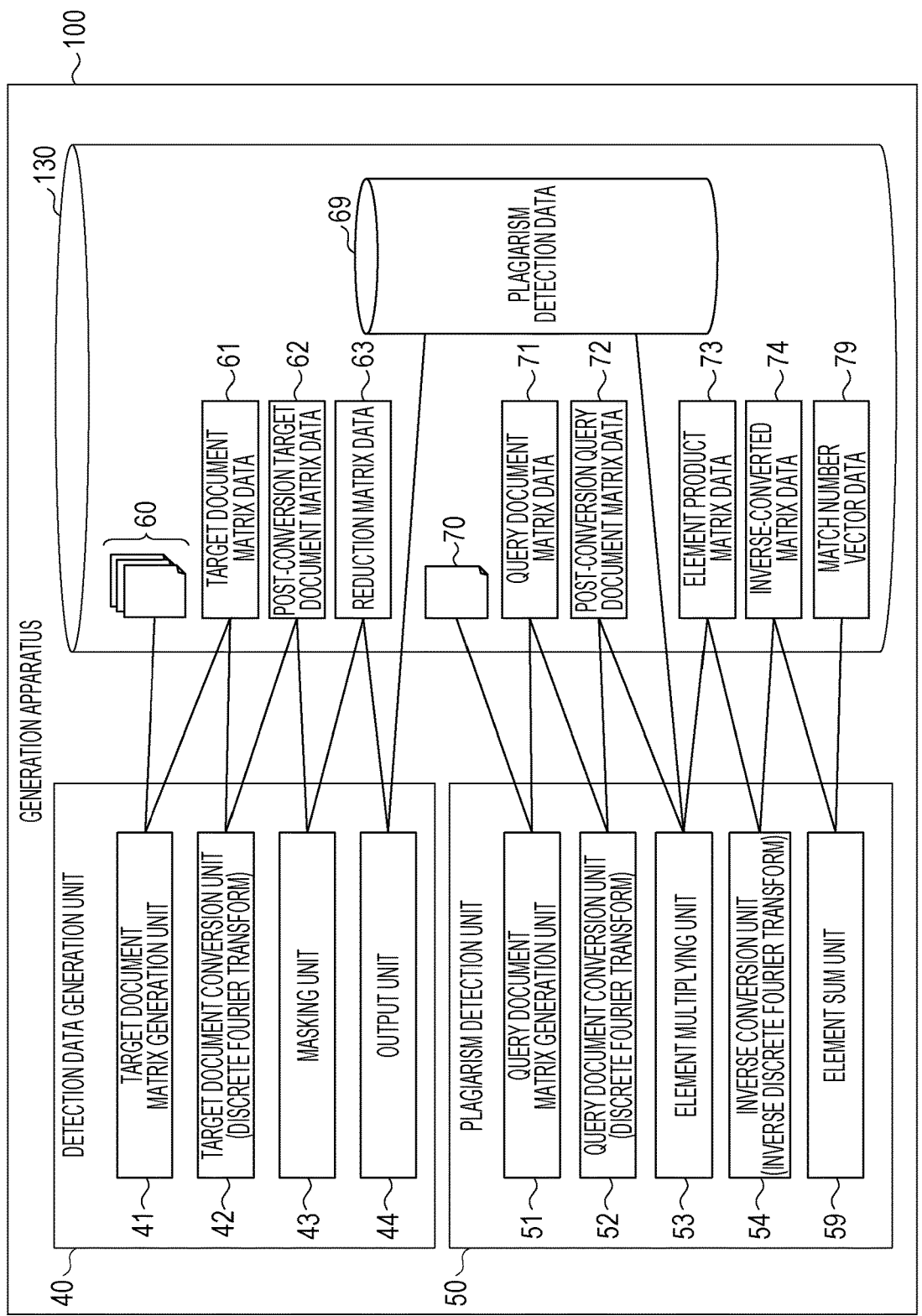
FIG. 11 is a diagram illustrating a first functional configuration example of the generation apparatus.

FIG. 11 is a diagram illustrating a first functional configuration example of the generation apparatus. In FIG. 11, the generation apparatus 100 mainly includes a detection data generation unit 40 and a plagiarism detection unit 50. The detection data generation unit 40 and the plagiarism detection unit 50 are realized by processing performed by executing a program corresponding the CPU 11.

The storage unit 130 stores the target document 60, a target document matrix data 61, post-conversion target document matrix data 62, reduction matrix data 63, the plagiarism detection data 69, the query document 70, query document matrix data 71, post-conversion query document matrix data 72, element product matrix data 73, post-inverse-conversion matrix data 74, match number vector data 79, and the like.

The detection data generation unit 40 is a processing unit that generates the plagiarism detection data 69 whose data amount is reduced and includes a target document matrix generation unit 41, a target document conversion unit 42, a masking unit 43, and an output unit 44.

The target document matrix generation unit 41 reads the target document 60, creates a numerical vector for each word configuring the target document 60, and generates target document matrix data 61. The target document matrix generation unit 41 generates the target document matrix data 61 represented by a matrix having a dimension number of numerical vectors of all words as rows and the number of words as a column, and stores the target document matrix data 61 in the storage unit 130.

The target document conversion unit 42 reads the target document matrix data 61 from the storage unit 130 and converts the target document matrix data by FFT. The post-conversion target document matrix data 62 obtained by the conversion is stored in the storage unit 130. The masking unit 43 reads the post-conversion target document matrix data 62 from the storage unit 130, masks by replacing components other than the low-level components corresponding to the low frequency components with zeros, thereby, obtaining the reduction matrix data 63 whose data amount is reduced from the target document matrix data 61. The number of rows to be masked or the number of low-level rows to be left as low-level components determined in advance.

The output unit 44 stores the reduction matrix data 63 in which the amount of data of the post-conversion target document matrix data 62 is reduced by the masking unit 43 as the plagiarism detection data 69 in the storage unit 130.

The plagiarism detection data 69 of each of the plurality of target documents 60 is stored in the storage unit 130. The plagiarism detection data 69 is data representing a matrix relating to the target document 60.

The plagiarism detection unit 50 is a processing unit that detects plagiarism by using the plagiarism detection data 69 in response to a request designating the query document 70 which determines whether or not a plagiarized part from a user is included. The plagiarism detection unit 50 includes a query document matrix generation unit 51, a query document conversion unit 52, an element multiplying unit 53, an inverse conversion unit 54, and an element sum unit 59.

The query document matrix generation unit 51 reads the query document 70 from a user from the storage unit 130 in response to a designated request, creates a numerical vector for each word configuring the query document 70, and generates the target document matrix data 61. The query document matrix generation unit 51 generates the query document matrix data 71 represented by a matrix having a dimension number of the numerical vectors of all words as rows and having the number of words as a column and stores the query document matrix data in the storage unit 130.

The query document conversion unit 52 reads the query document matrix data 71 and converts the query document matrix data by FFT. The post-conversion query document matrix data 72 obtained by the conversion is stored in the storage unit 130. The element multiplying unit 53 acquires the post-conversion query document matrix data 72 from the storage unit 130, reads the plagiarism detection data 69, and multiplies mutually corresponding elements of both matrices. That is, product of elements is obtained. The element product matrix data 73 represented by product of elements is stored in the storage unit 130.

The inverse conversion unit 54 obtains the post-inverse-conversion matrix data 74 from the storage unit 130, converts the post-inverse-conversion matrix data by inverse FFT, and obtains post-inverse-conversion matrix data 74. The post-inverse-conversion matrix data 74 is stored in the storage unit 130. The element sum unit 59 sums elements in each row of the post-inverse-conversion matrix data 74 and outputs the match number vector data 79 representing the number of matched words in each word to the storage unit 130. The element sum unit 59 may display the match number vector data 79 on the display device 15.

Figure 12A:
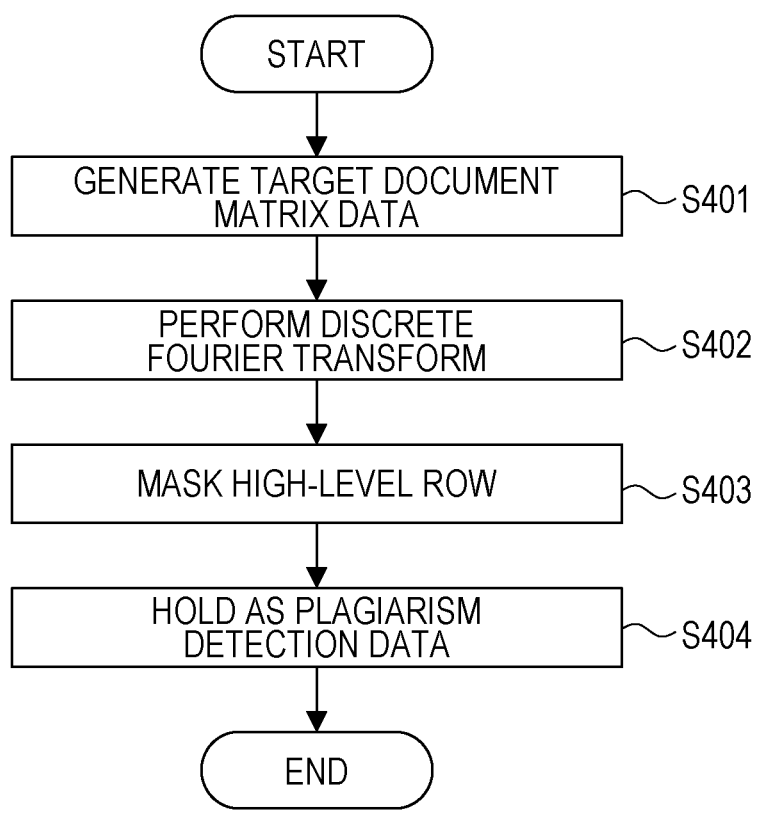

FIGS. 12A and 12B are diagrams illustrating detection data generation processing of the first functional configuration example of FIG. 11. FIG. 12A illustrates a flowchart, and FIG. 12B illustrates steps of the processing. The flowchart of FIG. 12A will be described with reference to FIG. 12B. In FIG. 12A, the detection data generation unit 40 performs steps S401 to S404 for each of the plurality of target documents 60 to generate the plagiarism detection data 69 whose data amount is reduced.

The target document matrix generation unit 41 in the detection data generation unit 40 creates a vector for each word of the target document 60, and generates target document matrix data 61 representing the target document 60 (step S401). The target document matrix data 61 is represented as an array $b_{ij}$ (i is a natural number of 1 to n, j is a natural number of 1 to d) and the like and stored in the storage unit 130.

The target document conversion unit 42 performs discrete Fourier transform on the target document matrix data 61 generated by the target document matrix generation unit 41 to obtain the conversion target document matrix data 62 (step S402). The post-conversion target document matrix data 62 is represented as an array $g_{ij}$ (i is a natural number of 1 to n, j is a natural number of 1 to d) and the like and stored in the storage unit 130.

Then, the masking unit 43 masks a upper row of the post-conversion target document matrix data 62 to obtain the reduction matrix data 63 (step S403), and the output unit 44 stores the obtained reduction matrix data 63 as the plagiarism detection data 69. Since the high frequency components 7HF are masked and only the low frequency components 7LF are represented as illustrated in FIG. 7, the reduction matrix data 63 reduces the amount of data of a upper row corresponding to the high frequency components 7HF in the plagiarism detection data 69.

In the existing technique which does not perform masking, the post-conversion target document matrix data 62 in which discrete Fourier transform is performed is held as the plagiarism detection data 69. In a case where the reduction matrix data 63 is held as the plagiarism detection data 69, the data amount of data of the plagiarism detection data 69 can be reduced more than the post-conversion target document matrix data 62.

In the present embodiment, one of the DFTs of the convolution operation illustrated in FIG. 3B, that is, the FFT first performed out of the FFT and the inverse FFT described above is previously performed, the amount of data is reduced, and the reduced data is held as the plagiarism detection data 69 in the storage unit 130. Next, plagiarism detection processing performed by the plagiarism detection unit 50 will be described.

Figure 13A:
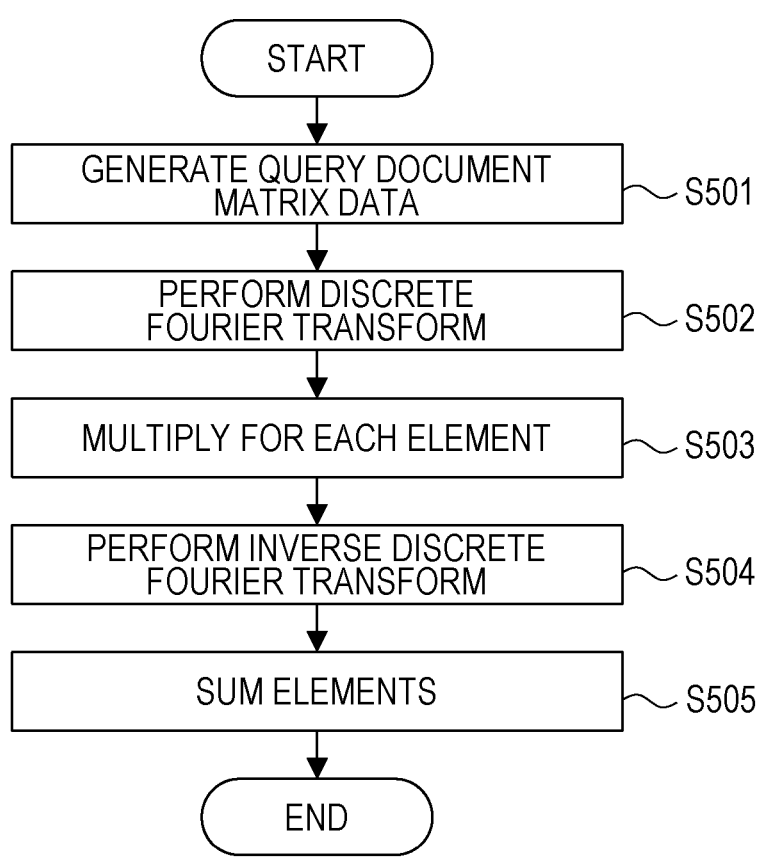
FIGS. 13A and 13B are diagrams illustrating plagiarism detection processing of the first functional configuration example of FIG. 11.
Figure 13B:
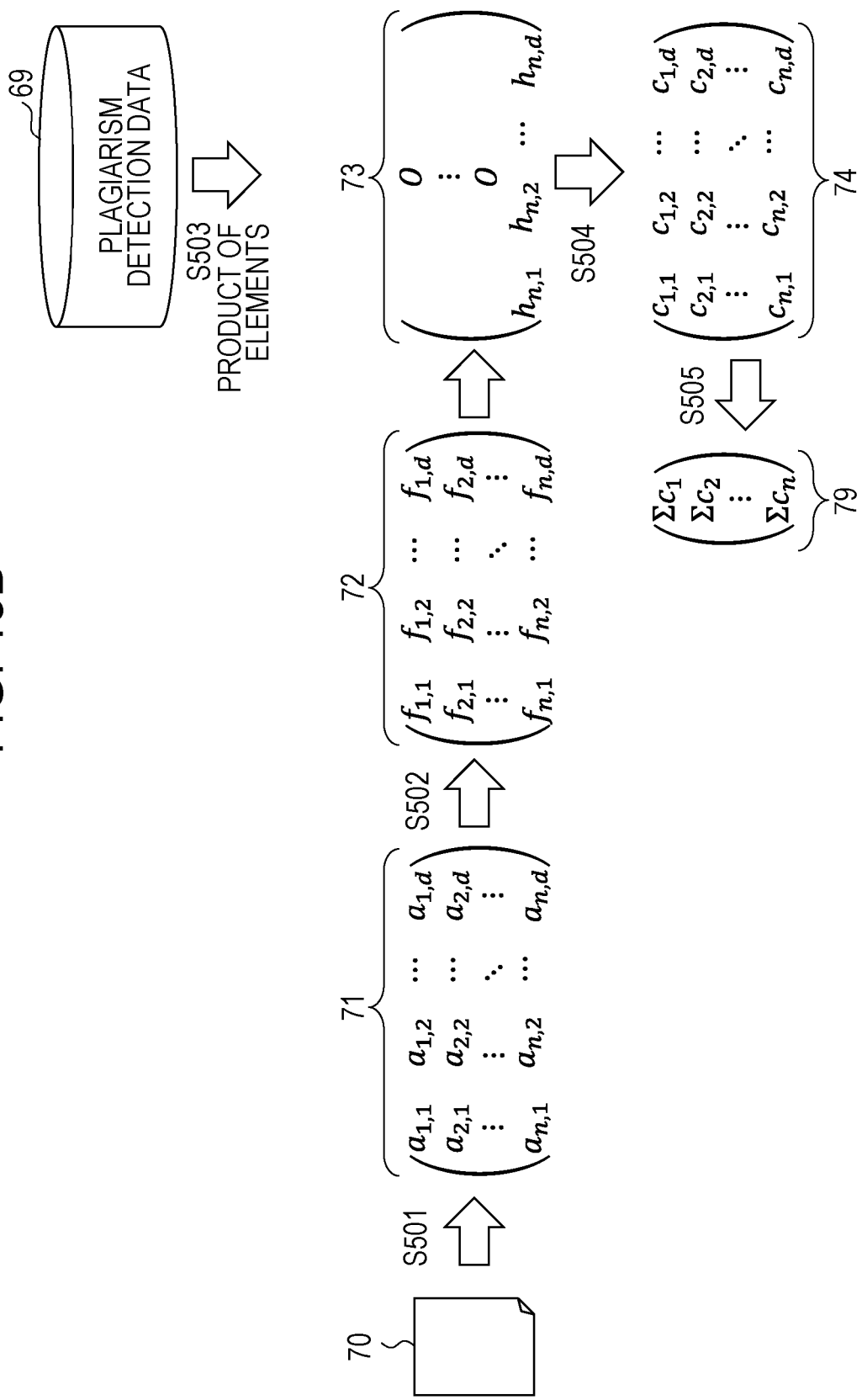

FIGS. 13A and 13B are diagrams illustrated the plagiarism detection processing according to the first functional configuration example of FIG. 11. FIG. 13A illustrates a flowchart, and FIG. 13B illustrates steps of the processing. The flowchart of FIG. 13A will be described with reference to FIG. 13B. In FIG. 13A, the plagiarism detection unit 50 performs steps S501 to S505 in response to a request designating the query document 70 from a user, and outputs the match number vector data 79 representing the number of matched words in each word.

The query document matrix generation unit 51 in the plagiarism detection unit 50 creates vectors for each word of the query document 70 and generates query document matrix data 71 representing the query document 70 (step S501). The query document matrix data 71 is represented as an array $a_{ij}$ (i is a natural number of 1 to n, j is a natural number of 1 to d) and stored in the storage unit 130.

The query document conversion unit 52 performs the discrete Fourier transform on the query document matrix data 71 generated by the query document matrix generation unit 51 to obtain the post-conversion query matrix data 72 (step S502). The post-conversion query matrix data 72 is represented as an array $f_{ij}$ (i is a natural number of 1 to n, j is a natural number of 1 to d) and stored in the storage unit 130.

The element multiplying unit 53 multiplies each element by the post-conversion query matrix data 72 and the plagiarism detection data 69 to create the element product matrix data 73 represented by product of elements (step S503). In the present embodiment, the element product matrix data 73 to be created represents a matrix whose upper row is masked. The element product matrix data 73 is represented as an array $h_{ij}$ (i is a natural number of 1 to n, j is a natural number of 1 to d) and the like and stored in the storage unit 130. Only 0 is represented in the array h corresponding to the upper row.

Then, the inverse conversion unit 54 performs inverse discrete Fourier transform on the element product matrix data 73 to acquire post-inverse-conversion matrix data 74 (step S504). The inverse discrete Fourier transform is performed for each element of each row of the element product matrix data 73 and the inverse discrete Fourier transform is repeatedly performed depending on a size of the matrix. The post-inverse-conversion matrix data 74 is represented as an array $c_{ij}$ (i is a natural number of 1 to n, j is a natural number of 1 to d) and the like and stored in the storage unit 130.

The element sum unit 59 sums elements of each row of the post-inverse-conversion matrix data 74 obtained by the inverse discrete Fourier transform, creates the match number vector data 79 representing the number of matched words in each word, and stores in the storage unit 130, and outputs the created data (step S505).

The row of the post-inverse-conversion matrix data 74 corresponds to the positional deviation a in FIG. 2. In addition, for example, the vector 79a in FIG. 3C is represented by the match number vector data 79. The match number vector data 79 is regarded as a vector by being represented by a matrix of n rows and 1 column such as an array $\Sigma c_i$ (i is a natural number of 1 to n) and is stored in the storage unit 130. The element sum unit 59 may display the match number vector data 79 in the display device 15.

Next, Experimental results obtained by using the plagiarism detection data 69 obtained from the plurality of target documents 60 by the inventor will be described below. FIG. 14 is a diagram illustrating a relationship between a data reduction rate and accuracy of plagiarism detection.

The experiment was performed as follows. ■•2,000 pairs of documents with plagiarism and 2,000 pairs of documents without plagiarism were used. The number of vocabularies is 143,600 words. ■•A method of matrix expression according to numerical values of a document was performed with a simple vector expression (One-hot) of words and random vector expression (Random). The dimension number was fixed to 100. ■•In the simple vector expression, words with the higher appearance frequency were used and compared with a case where high-level components were masked.

In a graph G91 illustrated in FIG. 14, a horizontal axis is denoted by a data reduction rate and a vertical axis is denoted by accuracy of plagiarism detection. The data reduction rate "0" corresponds to a case where all rows are masked, and the data reduction rate "1" corresponds to a case where all rows are not masked. The closer to 0, the higher the data reduction rate is. The data reduction rate in the present embodiment is a reduction rate of the amount of data considering a difference in the amount of data depending on a dimension size. In a case where a dimension number of the vector expression of a word is referred to as d, a non-masking rate without masking for the post-conversion target document matrix 62a is referred to as r, and a reference dimension is referred to as Dref, a data reduction rate DTr is expressed as $$DTr = (d/Dref) \times r \quad (1)$$

A maximum dimension at the time of experiment may be used as a reference dimension, and Dref is 100 in the example of FIG. 14.

From FIG. 14, it can be seen that a random vector expression represents higher accuracy than a simple vector expression, even though the data reduction rate is closer to "0". For example, in P1, the accuracy was decreased to 0.9% even though the data reduction rate was 98%. In addition, in P2, even though the data reduction rate was 90%, the accuracy was decreased to 0.1%.

In the random vector expression, if the data reduction rate is less than or equal to 80%, a decrease in accuracy due to a fixed number of dimensions is not observed. That is, no reduction in accuracy is observed in any of random (100 dimensions), random (20 dimensions), and random (4 dimensions). The random (20 dimensions) corresponds to a general English document. Meanwhile, in a case of the simple vector expression, the accuracy is clearly lower than the random vector expression even in a case where there is no data reduction.

From the experimental results, the dimension number and the data reduction rate may be set by preliminarily determining one or a plurality of dimensions of the vector expression of the word of the target document 60 by a random vector representation and acquiring a relationship with the data reduction rate by experiment.

A dimension number d of the vector expression of the word for performing the plagiarism detection processing with a size of a desired working area, and a high-level masking rate (1-r) may be obtained and set based on the previously obtained experimental results. A functional configuration example that obtains the dimension number d and a rate r based on the experimental results will be described below.

Figure 15:
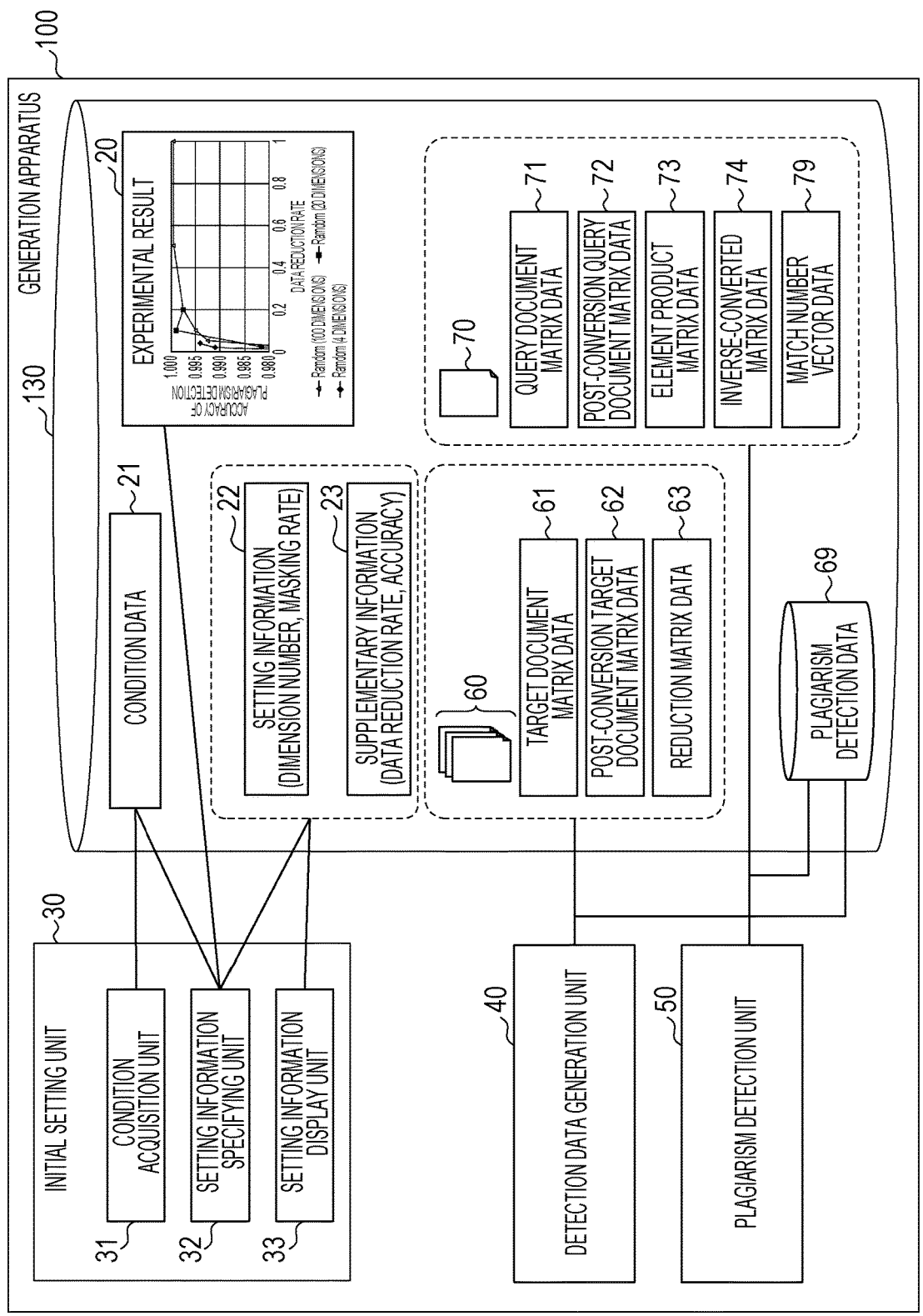
FIG. 15 is a diagram illustrating a second functional configuration example of the generation apparatus.

FIG. 15 is a diagram illustrating a second functional configuration example of the generation apparatus. In FIG. 15, the generation apparatus 100 includes an initial setting unit 30 in addition to the first functional configuration illustrated in FIG. 11, and the storage unit 130 stores experimental result 20, condition data 21, setting information 22, supplementary information 23, and the like. The detection data generation unit 40, the plagiarism detection unit 50, and various related data are the same as in the first functional configuration, and thus description thereof will be omitted.

The initial setting unit 30 is a processing unit that sets information relating to processing in the detection data generation unit 40 and the plagiarism detection unit 50, based on the conditions desired by a user. The initial setting unit 30 includes a condition acquisition unit 31, a setting information specifying unit 32, and a setting information display unit 33.

The condition acquisition unit 31 displays a screen for acquiring the condition data 21 on the display device 15, acquires the condition data 21 from a user, and stores the acquired data in the storage unit 130. The setting information specifying unit 32 reads the condition data 21 and the previously prepared experimental result 20 from the storage unit 130 and specifies the dimension number satisfying the condition data 21, the data reduction rate, the accuracy, and the like, based on the experimental result 20.

The setting information 22 indicating the dimension number and the masking rate (1-r) and the supplementary information 23 indicating the data reduction rate, accuracy, and the like are stored in the storage unit 130. Instead of the masking rate (1-r), the non-masking rate r may be designated.

The setting information display unit 33 displays the setting information 22 and the supplementary information 23 on the display device 15. Application of the setting information 22 is determined by determination, which is made by a user, of application to processing performed by the detection data generation unit 40 of the setting information 22 displayed on the display device 15 and the plagiarism detection unit 50. In a case where the setting information 22 is not applied, the processing from the condition acquisition unit 31 may be repeated. Alternatively, the experimental result 20 may be displayed on the display device 15, and the dimension number, the data reduction rate, the accuracy, and the like which are obtained from a position selected by the user on the experimental result 20 may be set as the setting information 22.

The experimental result 20 is a data file representing the results previously obtained by experiments performed by the user and is a graph illustrating the accuracy according to the data reduction rate for one or each of a plurality of dimensions as illustrated in FIG. 14.

The condition data 21 represents the amount of data that a user wants to limit or accuracy desired by the user. The amount of data to be limit is designated by a magnification relative to a size of the target document 60. The setting information 22 includes information such as the dimension number, the data reduction rate, and the accuracy which are obtained based on the experimental result 20 and the condition data 21.

The dimension number indicates the dimension number of the word vector expression (FIG. 3A). The data reduction rate indicates a ratio of a upper row masked by 0 with respect to the total number of rows of the post-conversion target document matrix data 62. In the present embodiment, the ratio of the upper row is represented, but the data reduction rate may be a ratio to the total number of rows of a low-level row to be held without masking. The accuracy illustrates a value obtained from the experimental result 20 by a set of the dimension number and the data reduction rate.

Figure 16:
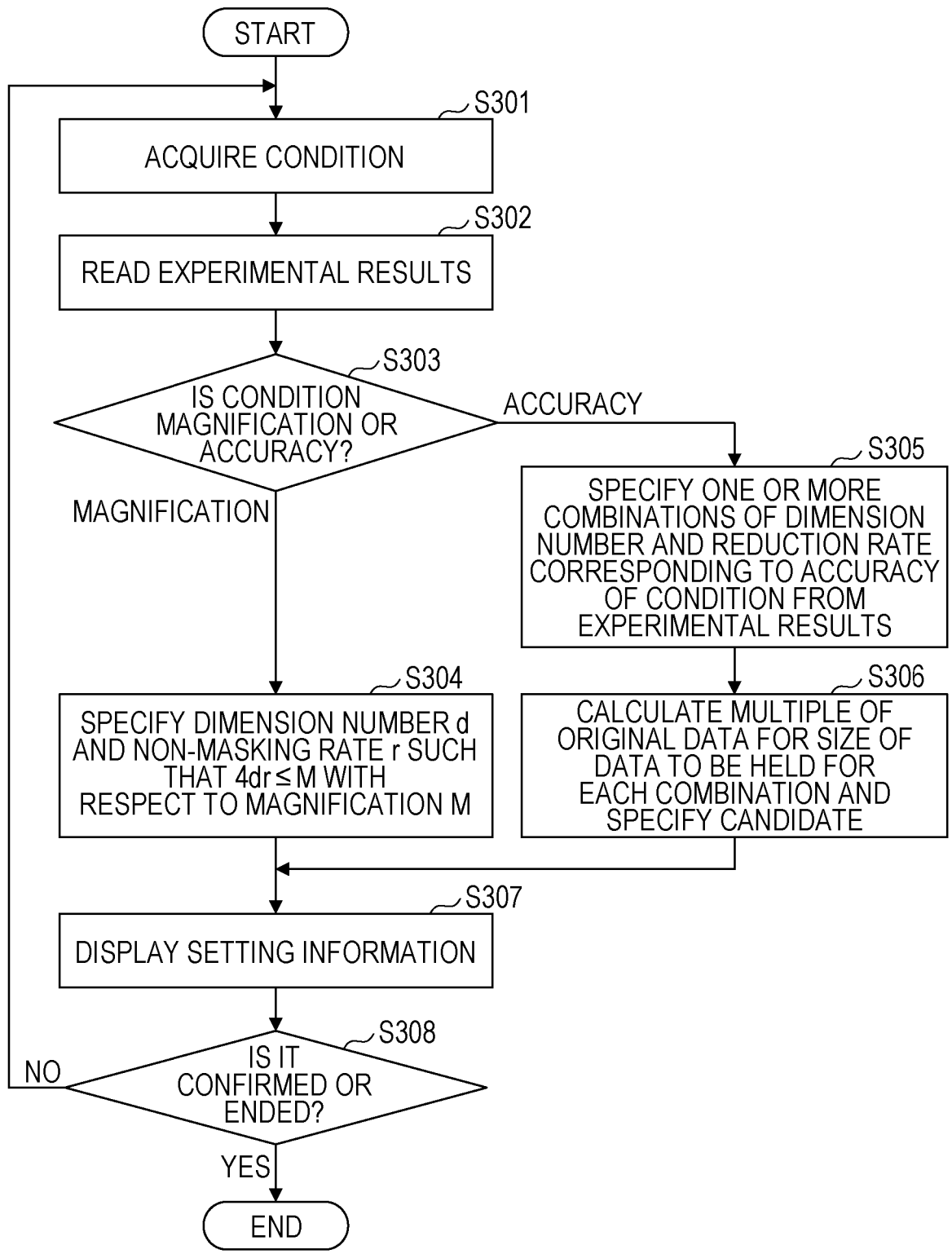
FIG. 16 is a flowchart illustrating an initial setting processing of the second functional configuration example of FIG. 15.

FIG. 16 is a flowchart illustrating initial setting processing of the second functional configuration example of FIG. 15. In FIG. 16, the condition acquisition unit 31 in the initial setting unit 30 displays a condition setting screen G97 (FIG. 17) on the display device 15, acquires a value set by a user, and stores the value in the storage unit 130 as the condition data 21 (step S301).

If the condition data 21 is acquired, the setting information specifying unit 32 reads the experimental result 20 (step S302) and determines whether a condition designated by a user is the magnification relating to the amount of data or the accuracy with reference to the condition data 21 (step S303).

The setting information specifying unit 32 specifies the dimension number d and the non-masking rate r for a magnification M from the experimental result 20 (step S304), under a condition of following formula.

$$4dr \leq M \qquad (2)$$

In the discrete Fourier transform, approximately twice the amount of data is used to express an imaginary number, compared to a real number, and the amount of data is doubled by padding. Thus, dr in the above equation (2) is multiplied by a coefficient "4".

The equation (1) for DTr is also represented as follows.

$$DTr = (d \times r)/Dref \qquad (3)$$

It is further modified as follows.

$$dr = Dref \times DTr \qquad (4).$$

Furthermore, by multiplying by 4, the equation is further modified.

$$4dr = 4Dref \times DTr \leq M \qquad (5)$$

Here, since the reference dimension Dref is given in advance, the data reduction rate DTr is obtained by using the magnification M designated by a user. The dimension number d and the accuracy are obtained from the experimental result 20 using the obtained data reduction rate DTr. If the equation (4) is further modified, the equation is represented as follows.

$$r = (DTr \times Dref)/d \qquad (6)$$

Thereby, the non-masking rate r is obtained. The setting information specifying unit 32 stores the setting information 22 indicating the dimension number d and the non-masking rate r, and the supplementary information 23 indicating the data reduction rate DTr, accuracy, and the like in the storage unit 130.

Meanwhile, in step S303, in a case where it is determined that the condition designates the accuracy, the setting information specifying unit 32 specifies one or more combinations of the dimension number and the reduction rate corresponding to the accuracy of the condition, from the experimental result 20 (step S305). For example, the setting information specifying unit 32 specifies a combination of the dimension number and the reduction rate that is greater than or equal to the accuracy of condition, and a combination of the dimension number and the reduction rate in a range that is less than or equal to a predetermined allowable value from the accuracy of condition.

Then, the setting information specifying unit 32 calculates a multiple of original data with respect to a size of the data to be retained, for each combination, and specifies a candidate (step S306). In a case where there are a plurality of combinations of the dimension number and the reduction rate which are greater than or equal to the accuracy of condition, a combination with the highest accuracy and a combination with the smallest magnification may be selected to be used as a candidate. A user can select accuracy of plagiarism detection in consideration of increase in the amount of data being processed. The setting information specifying unit 32 stores one or a plurality of pieces of setting information 22 indicating the dimension number, the reduction rate, the accuracy, and the like in the storage unit 130.

If one or more pieces of setting information 22 are obtained by the setting information specifying unit 32, the setting information display unit 33 displays a setting information screen G98a or G98b (FIG. 19) indicating the setting information 22 on the display device 15 (step S307). The setting information display unit 33 displays the setting information screen G98a on the display device 15 in a case where the condition data 21 is magnified. The setting information display unit 33 displays the setting information screen G98b on the display device 15 in a case where the condition data 21 designates the accuracy.

If an operation of a user is input after the setting information screen G98a or G98b is displayed (FIG. 19), whether determination or end is selected is determined (step S308). In a case where cancel is selected (NO in step S308), the initial setting unit 30 returns to step S301 and repeats the same processing as described above. Meanwhile, in a case where the determination or the end is selected (YES in step S308), the initial setting unit 30 ends the initial setting process.

In the above description, an example in which either a magnification or accuracy representing a size of a region is selected is described, and the magnification and the accuracy may be set as a condition. A point that is greater than or equal to the accuracy designated by the condition may be obtained based on the dimension number d and the non-masking rate r that satisfy the equation (2), with reference to the experimental result 20.

Figure 17:
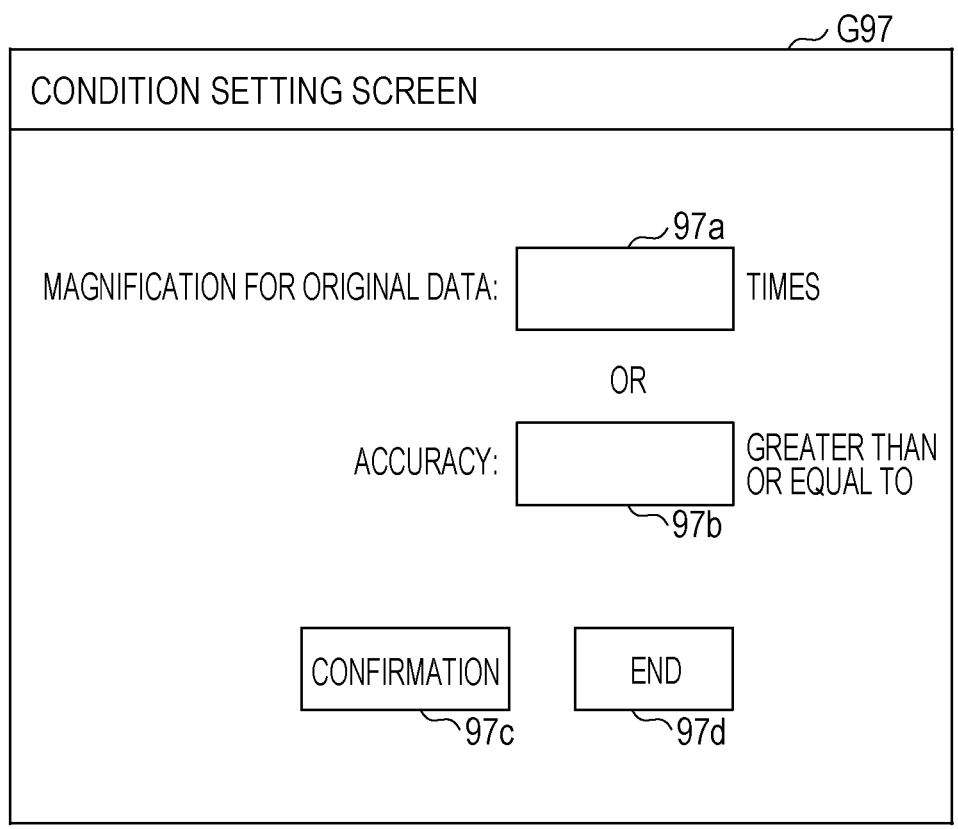
FIG. 17 is a diagram illustrating an example of a condition setting screen.

FIG. 17 is a diagram illustrating an example of the condition setting screen. In FIG. 17, the condition setting screen G97 includes an area 97a for designation a magnification, an area 97b for designating accuracy, a determination button 97c, and an end button 97d.

A user sets a value in any one of the area 97a and the area 97b. For example, 8 is input to the area 97a, and eight times the magnification for original data are designated. Alternatively, in the area 97b, 0.999 is input and accuracy higher than or equal to "0.999" is designated. A value "1" has the highest accuracy.

A relationship between the experimental result 20 previously prepared and the above-described condition setting by the user will be described with reference to FIG. 18. FIG. 18 is a diagram illustrating the relationship between the experimental result and the condition setting. A graph G92 illustrated in FIG. 18 represents the experimental result 20, and a horizontal axis and a vertical axis are the same as those in FIG. 14.

In FIG. 18, the graph G92 illustrates experimental results by random vector expression of each of 100 dimensions, 20 dimensions, and 4 dimensions. Three points Q1, Q2, and Q3 are illustrated in the graph G92 with respect to (data reduction rate, accuracy of plagiarism detection).

The point Q1 is a point corresponding to the dimension number d and the non-masking rate r such that 4dr<8, which is obtained by the setting information specifying unit 32 in a case where the condition is 8 times. In this case, since the reference dimension Dref is 100 and the magnification M is 8, the data reduction rate DTr is obtained by the equation (5) as 0.02 (=8/(4×100)). It can be determined that the dimension number d is 4 with reference to the experimental result 20 with the obtained data reduction rate DTr.

Then, by inserting the data reduction rate DTr, the reference dimension Dref, and the dimension number d of the obtained point Q1 into the equation (6), 0.02×(100/4) is calculated and the non-masking rate "0.5" is obtained. Thus, the dimension number d is 4, and the non-masking rate r is 0.5. The non-masking rate r illustrated below can also be obtained in the same way.

From the above, it can be determined that, "when d=4 and r=0.5, accuracy 0.991 is expected".

In the condition of accuracy higher than or equal to "0.999", the points Q2 and Q3 are selected. The points Q2 and Q3 will be described.

The point Q2 is a point in which accuracy is "0.999" or more and a magnification is the smallest. That is, since the dimension number d is "20" and the non-masking rate r of "0.5" is obtained by the equation (6), 4dr is calculated, and thereby, it is predicted that the amount of data becomes "40" the original data. Since accuracy of the point Q2 is "0.999", it can be determined that "when d=20 and r=0.5, accuracy of "0.999" is expected and a size of data to be held is approximately 40 times the original data".

The point Q3 is a point in which accuracy is "0.999" or higher and the accuracy is the highest. In the point Q3, the dimension number d is "100", and the non-masking rate r of "0.5" is obtained by Equation (6). Thus, it is predicted that, by calculating 4dr, the amount of data becomes "200" times the original data. Since accuracy of the point Q3 is "0.9995", it can be determined that "when d=100 and r=0.5, accuracy higher than or equal to "0.9995" is expected and a size of data to be held is approximately 100 times the original data".

In the above description, since the non-masking rate r=0.5, the masking rate (1-r) is also 0.5.

Figure 19A:
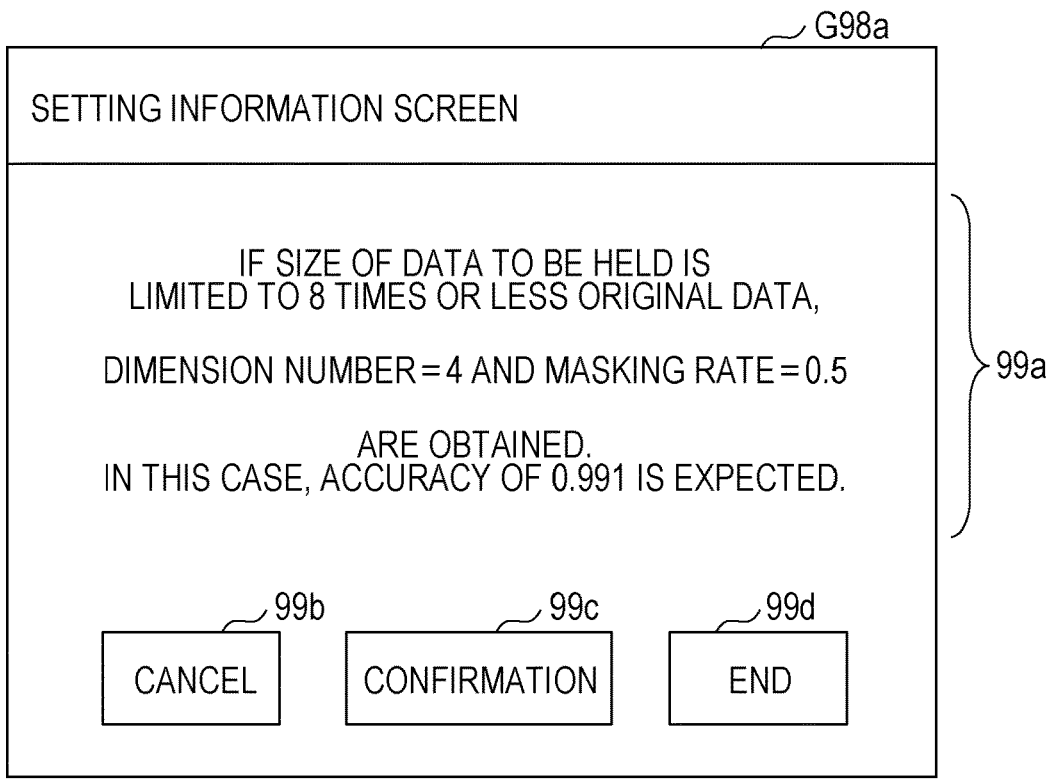
FIGS. 19A and 19B are diagrams illustrating an example of a setting information screen.
Figure 19B:
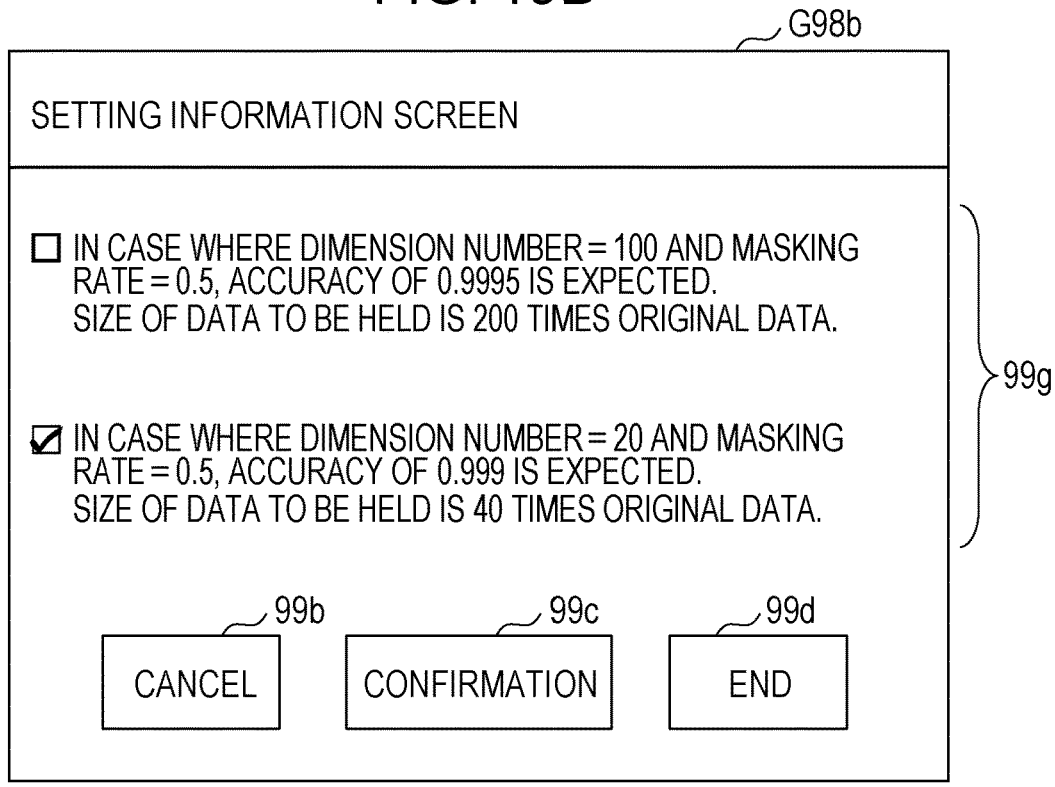

An example of a setting information screen displayed based on the determination results obtained from the points Q1 to Q3 will be described. FIGS. 19A and 19B are diagrams illustrating the example of the setting information screen. FIG. 19A illustrates the example of the setting information screen in a case where a magnification is designated to a condition. FIG. 19B illustrates the example of the setting information screen in a case where accuracy is designated to the condition.

The setting information screen G98a exemplified in FIG. 19A is a screen illustrating information obtained from the point Q1 in FIG. 18, and includes a display area 99a for displaying various kinds of information in a case where a magnification desired by a user is set, a cancel button 99b, a determination button 99c, and an end button 99d.

In a case where a magnification is designated to "8", the display area 99a displays a message, for example, "In a case where a size of data to be held is 8 times or less the original data, the dimension number is 4 and the masking rate is 0.5. In this case, accuracy of 0.991 is expected.". The masking rate may be displayed as a value obtained by subtracting the given non-masking rate r from 1. The same applies to the following.

If a user confirms this display content and presses the cancel button 99b, the condition setting screen G97 in FIG. 17 is displayed, and the user can reset the condition. In a case where the determination button 99c is pressed, the dimension number "4" and the masking rate "0.5" are set, a vector expression of each word of the target document 60 in the detection data generation processing and the query document 70 in the plagiarism detection processing is made in four dimensions, and masking on the post-conversion target document matrix 62a in the detection data generation processing is performed with the masking rate of "0.5". Rows from a high level to a half of the total number of the rows of the post-conversion target document matrix 62a are masked. In a case where the end button 99d is pressed, the initial setting unit 30 ends the initial setting processing.

The setting information screen G98b exemplified in FIG. 19B is a screen illustrating information obtained from the points Q2 and Q3 in FIG. 18, and includes a selection area 99g for selectably displaying a candidate of a combination of the dimension number and the masking rate for obtaining accuracy desired by a user, a cancel button 99b which is the same as the setting information screen G98a, and a determination button 99c, and an end button 99d.

In a case where accuracy of "0.999" or higher is designated, the selection area 99g displays a message, for example, "In a case where a dimension number is 100 and a masking rate is 0.5, accuracy of 0.9995 is expected. A size of data to be held is 200 times the original data."
as a first candidate.

In addition, the selection area 99g displays a message, for example,

"In a case where a dimension number is 20 and a masking rate is 0.5, accuracy of 0.999 is expected.

A size of data to be held is 40 times the original data."
as a second candidate.

As a user selects either the first candidate or the second candidate and presses the determination button 99c, the dimension number and the masking rate indicated by the selected candidate are applied to detection data generation processing and plagiarism detection processing as illustrated in FIG. 19A.

For example, in a case where the second candidate is selected, the vector expression of each word of the target document 60 in the detection data generation processing and the query document 70 in the plagiarism detection processing is made in 20 dimensions, and the masking on the post-conversion target document matrix 62a in the detection data generation processing is performed with the masking rate of "0.5". Rows from a high level to a half of the total number of rows of the post-conversion target document matrix 62a are masked. The cancel button 99b and the end button 99d are the same as described in FIG. 19A, and thus, description thereof will be omitted hereinafter.

In the present embodiment, in a case where the experimental result 20 is not obtained, a score vector can be approximated with high accuracy by a random vector expression of the dimension number d of approximately the logarithm of the number of vocabulary for a general document. In addition, when the masking rate is 0.5, there is almost no decrease in accuracy of plagiarism detection. Thus, the masking rate may be set to 0.5 as a specified value, and the dimension number d may use an experienced value as the specified value.

In the present embodiment, the amount of calculation relating to the convolution operation in FIG. 3B is reduced in addition to reduction of the amount of data of the plagiarism detection data 69 described above. First, each word or character string of the two documents of the query document 70 and the target document 60 (hereinafter, may be simply referred to as a "document") is input, and an existing calculation method for obtaining the match number b of words with respect to all the positional deviations (FIG. 3B) will be described. In the following description, the match number of words obtained by associating the two documents with all the positional deviations is referred to as "correlation".

As a related technique for obtaining correlation between sentences, there is a fast algorithm fast Fourier transform (FFT)-based Algorithm (hereinafter, may be simply referred to as FFT) for obtaining the correlation. The FFT-based Algorithm is an algorithm for calculating discrete Fourier transform (DFT) at high speed on a computer. In the generation apparatus 100, the discrete Fourier transform (DFT) is performed by the FFT and inverse discrete Fourier transform (inverse DFT) is performed by inverse FFT.

In FFT processing, a convolution operation of O (n log n) time is repeated σ number of times. Here, a represents the number of kinds of words or character strings, and n represents the number of words of each sentence or a length of the character string.

Next, calculation time of the correlation is considered. As an example of the correlation calculation, a simple calculation in which comparisons between words are sequentially performed, and the amount of calculations using FFT are compared.

Basically, in a case where σ≤n, FFT is faster than a simple calculation. That is, in a case where σ is steady and small, $O(n^2)$ and O(n log n) are compared with each other. However, in a case where a is not steady and small, an advantage of O(σn log σ) with respect to $O(n^2 \log \sigma)$ is small. That is, a case where a is large is not assumed, a steady and small a is assumed, and calculation time is treated as O(n log n) (M. J. Fischer and M. S. Paterson: String-matching and other products, Complexity of Computation (Proceedings of the SIAM-AMS Applied Mathematics Symposium, New York, 1973). Pp. 113-125. 1974, D. Gusfield: Algorithms on Strings, Trees and Sequences: Computer Science and Computational Biology, Cambridge University Press, 1977). Thus, there is a problem that the number of FFT executions increases.

To solve this problem, it is proposed to approximate by using only results of k times from repetition of convolution (M. J. Atallah et al.: A randomized algorithm for approximate string matching. Algorithmica. 29: 468-486, 2001, K, Baba et al.: A Note on Randomized Algorithm for String Matching with Mismatches, Nordic Journal of Computing, 10 (1): 2-12, 2003, and T. Schoenmeyr and D Yu-Zhang: FFT-based Algorithms for the String Matching with Mismatches Problem, Journal of Algorithms, 57: 130-139, 2005). However, since a convolution operation is treated as one processing unit, number of times of the convolution operation is reduced.

Furthermore, in the approximation method (M. J. Atallah et al.: A randomized algorithm for approximate string matching. Algorithmica. 29: 468-486, 2001, K, Baba et al.: A Note on Randomized Algorithm for String Matching with Mismatches, Nordic Journal of Computing, 10 (1): 2-12, 2003, and T. Schoenmeyr and D Yu-Zhang: FFT-based Algorithms for the String Matching with Mismatches Problem, Journal of Algorithms, 57: 130-139, 2005), an approximate value is output instead of an exact value. In a document of a length n, dispersion of an estimated value of correlation $c_i$ obtained by repeating 10 times is represented by $(n-c_i)/k$. The dispersion represents the extent to which an approximate value is scattered with respect to the correct value $c_i$. If n is large, an error is small, and it is not suitable for a long document. Furthermore, if $c_i$ is small, the error is large. A small value of the correlation indicates that accuracy of the estimated value is small. That is, the approximation method may not be applied to a case where a moving average calculation and the entire correlation are used for machine learning and the like as a vector.

In the related art, the convolution operation is a general concept in the field of signal processing and the like. In signal processing, a is small because data is processed by using a data length defined by communication between transmission and reception as a processing unit.

In addition, the convolution operation can use an existing function even in a programming language. In such a development environment, detailed analysis of a processing load within the convolution operation is not made. A length of a document such as an academic journal or academic papers is much larger than a data length in communication.

In the present embodiment, in a case where a is large, processing speed is further increased, and the present corresponds to demand for obtaining the correlation for a large amount of data with large a in comparison between recent documents and the like.

Here, a problem in calculation time of the correlation is realistic reduction in execution time. Specifically, it is to reduce a coefficient part for σn log σ, that is, the number of FFT executions. The inventor focused on the fact that a convolution operation is performed by processing of the DFT and the inverse DFT and realized speedup of calculation processing of the correlation in a case where a large amount of data of large σ is treated. The large amount of data of large σ will be described in the following description by taking two documents as an example.

In a case where correlation between two documents s and t is obtained, positions of similar parts similar in two or more consecutive words within each character string of the two documents s and t are not necessarily the same. A case where a position in which similar parts appear deviates may be considered. A positional deviation which is considered in correlation will be described.

First, a notation relating to correlation calculation between two character strings is defined as follows.

Σ: a set of characters,

Σ'': a set configured with total character strings of a length n,

|u|: a length of a character string u, $u_i$: an ith character of the character string u (1≤i≤|u|), uv: a character string obtained by adding u to v, a'': a character string configured with n characters Words of the document s and the document t are represented as elements of a set Σ'' configured with total character strings of a length n.

$$s,t \in \Sigma^n$$

A correlation c(s, t) between the document s and the document t is represented by a (2n−1)-dimensional vector, and the ith element is represented by following formula.

$$c_i = \sum_{j=1}^{n} \delta(s_j, t'_{i+j-1}) \ (1 \le i \le 2n-1)$$

However, with respect to this formula, the character string is represented like following formula, and thereby, adding a dummy word is expressed for a formal comparison out of a range.

$$x \notin W$$

$$t' = x^{n-1} t x^{n-1}$$

By doing so, it is possible to calculate the correlation by considering the positional deviation.

Figure 20:
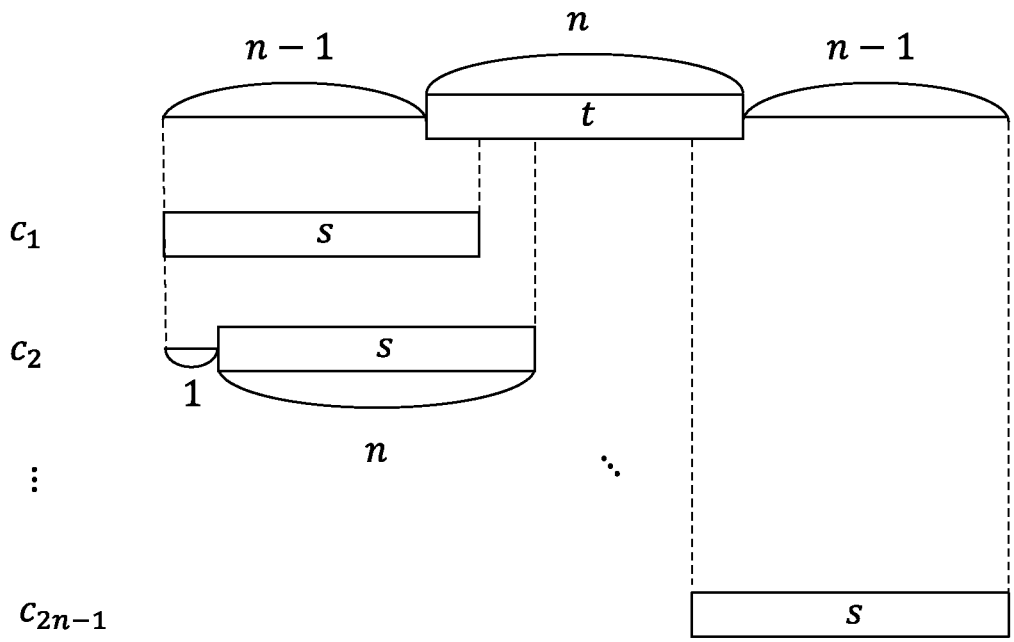
FIG. 20 is a diagram illustrating positional deviation.

FIG. 20 is a diagram illustrating a positional deviation. FIG. 20 illustrates a conceptual diagram of adding a dummy word not belonging to both the document s and the document t before and after the document t so as to consider the positional deviation of a word between the document t and the document s.

The document s is shifted word by word, and the correlation between one word of the document t in the shifted position and one word of the document s is calculated. With respect to the document t, a case where a word sequence is changed in the document s corresponds to a shift position. By calculating the correlation for each word shift, correlations $c_1, c_2, \ldots, c_{2n-1}$ for each shift are obtained.

In a case where it is assumed that the correlation c(s, t) in which all the positional deviations are considered corresponds to the number of matched words in all positional deviations, a comparison between words is performed $O(n^2)$ number of times in a simple calculation. Here, one time of one word comparison depends on log σ.

FIG. 20 is a diagram illustrating an example of correlation between documents. FIG. 20 illustrates an example of the correlation in a case where the document s is a character string "abbacab" and the document t is a character string "ababbac". In FIG. 20, a dummy word x is represented by a blank.

A head of the document s is added to a head of a document t'' to which a dummy added after n−1 before and after the document t, and the document s is shifted word by word to count the number of matched words. In this example, in a case where the head of the document s is added to the head of the document t', there is no matched word in the document s and the document t. Thus, the correlation $c_1$ becomes 0. If words are shifted word by word, two words in a tail of the document s match two words in the head of the document t. Thus, the correlation $c_2$ becomes 2.

Further, the correlation c3 obtained by shifting one word becomes 0. Sequentially, correlation $c_4$ becomes 3, correlation $c_5$ becomes 1, correlation $c_6$ becomes 2, correlation $c_7$ becomes 3, correlation $c_8$ becomes 1, correlation $c_9$ becomes 5, correlation $c_{10}$ becomes 1, correlation $c_{11}$ becomes 0, correlation $c_{12}$ becomes 1, and then correlation $c_{13}$ becomes 0.

Here, a convolution operation performed by the FFT performed for each kind of words or character strings.

A cyclic convolution r of the two n-dimensional vectors u and v is represented by following formula.

$$r_i = \sum_{j=1}^{n} u_j \cdot v_{i-j+1} \quad (1 \le i \le n)$$

Here, $v_i = v_{n+i}$ for $-n+1 \le i \le 0$.

If it is assumed that R, U, and V are obtained by the discrete Fourier transform of r, u, and v, respectively and · is product (inner product) for each element, a formula for R is represented as follows.

$$R = U \cdot V$$

From this, r can be calculated by FFT at O(n log n) time from u and v. A relationship between a calculation route and calculation time will be described with reference to FIG. 21.

Figure 21:
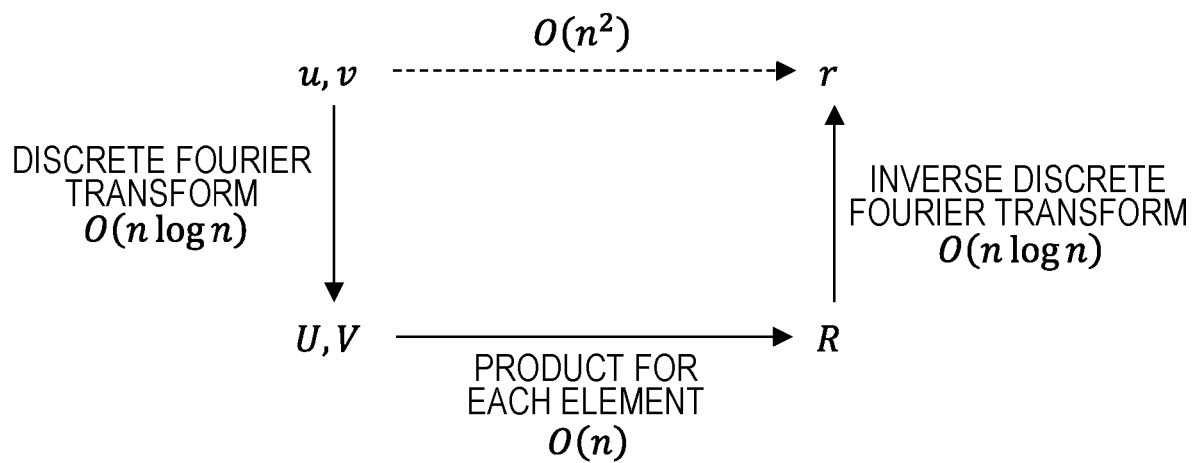
FIG. 21 is a diagram illustrating a relationship between calculation and calculation time.

FIG. 21 is a diagram illustrating a relationship between calculation and calculation time. In FIG. 21, n represents a length of a sentence. In a case of calculation in which r is obtained from u and v, that is, a comparison r between a word u and a word v is performed, the calculation time is represented by $O(n^2)$.

Meanwhile, the calculation time of the discrete Fourier transforms U and V of u and v is O(n log n), and the calculation time of product R for each element of U and V is O(n). The calculation time of an inverse FFT from R to r is O(n log n).

Next, an overview of an FFT-based algorithm will be described. In the FFT-based algorithm, a word is converted into a numerical value, and correlation between character strings is calculated by convolution of a vector. By doing so, if a word a in the set E of all the character strings is replaced with 1 and the others are replaced with 0, the correlation considering only matching of the word a can be calculated by a convolution operation and can be calculated at O(n log n) time. The replacement from a document to a numeric string is O(n) time. In addition, since match or mismatch can be expressed by multiplication, the convolution operation can be applied.

The convolution operation is repeated by the number of kinds of words or character strings a times so as to perform the convolution operation of O(n log n) time for each kind of the words or the character strings which are elements in the set Σ of all the character strings. Then, the correlation is calculated by summing the respective elements of the vector. That is, the correlation $c_i$ at a certain positional deviation is obtained. In addition, since the inner products of vectors are summed, the obtained correlation can be regarded as a weighted correlation.

More specifically, a calculation Formula of the FFT-based algorithm is as follows. In the formula, $\varphi_a$ is a function that takes a as 1 and the others as 0.

From a definition if $C'_c$ above, following formula is represented for $n \le i \le 2n-1$.

$$a \in \Sigma$$

$$c_i = \sum_{j=1}^{n} \delta(s_j, t'_{i+j-1}) = \sum_{j=1}^{n} \sum_{a \in \Sigma} \phi_a(s_j) \cdot \phi_a(t'_{i+j-1})$$

Here, a sequence of addition is changed to be a formula as follows.

$$c_i = \sum_{j=1}^{n} \sum_{a \in \Sigma} \phi_a(s_j) \cdot \phi_a(t'_{i+j-1})$$

Here, $(u_{a,1}, u_{a,2}, \ldots, u_{a,2n-1})$ and $(v_{a,1}, v_{a,2}, v_{a,2n-1})$ are represented by as follows.

When $1 \le i \le n$, $u_{a,i} = \phi_a(s_{n-i+1})$, $v_{a,i} = \phi_a(t_i)$

When $n \le i \le 2n-1$, $u_{a,i} = 0$, $v_{a,i} = 0$

In the above, when $1 \le i \le n$, one side is inverted, and when $n \le i \le 2n-1$, 0 is embedded. If (2n−1)-dimensional vector is used, the formula is represented as follows.

$$c_i = \sum_{a \in \Sigma} \sum_{j=1}^{2n-1} u_{a,j} \cdot v_{a,i-j+1} \quad (1 \le i \le 2n-1)$$

The part as follows within the above formula is a cyclic convolution operation.

$$\sum_{j=1}^{2n-1} u_{a,j} \cdot v_{a,i-j+1}$$

In a case where a positional deviation of a similar part is considered, a convolution operation corresponding to the number of kinds (elements in the set Σ of all the character strings) of words or character strings is repeated, and thereby, calculation time is increased. ■•For one time of the convolution operation, FFTs are performed twice, product (inner product) is performed once for each vector element, and inverse FFT is performed once. Here, it is considered that the calculation time of the inverse FFT corresponds to the calculation time of FFT. ■•Regarding each calculation time of the FFT, the FFT is O(n log n) time, the product of each element is O(n) time, and the FFT is dominant. ■•Thus, it can be seen that the FFT is demanded three σ times in one calculation of correlation.

In addition, the repetitive number of times a of the convolution operation is a logical minimum value with respect to an alphabet size σ.

In a related technique that performs a convolution operation for each kind of word or character string and integrates the results, the inventor found that the number of times of the Fourier transform is reduced by integrating the results before the Fourier transform (inverse FFT) which is the last processing of the convolution operation. In order to reduce the number of times of the Fourier transform, modification of a calculation equation which focused on by the inventor will be described.

If $r_a$ is a cyclic convolution of $u_a$ and $v_a$, correlation c(s, t) is obtained from the vector as follows.

$$\left( \sum_{a \in \Sigma} r_{as,1}, \sum_{a \in \Sigma} r_{a,2}, \ldots, \sum_{a \in \Sigma} r_{a,2n-1} \right)$$

This vector is represented as follows.

$$\sum_{a \in \Sigma} r_a$$

It can be seen from the right side of the formula for $C_i$ that the inverse FFT may be performed after addition of every element of the vector. The inverse FFT after addition of each element is regarded as the FFT of one time.

$$\sum_{a \in \Sigma} r_a = \sum_{a \in \Sigma} f^{-1}(R_a) = f^{-1}\left(\sum_{a \in \Sigma} R_a\right)$$

Here, f is a discrete FFT and $R_a = f(r_a)$.

Figure 22:
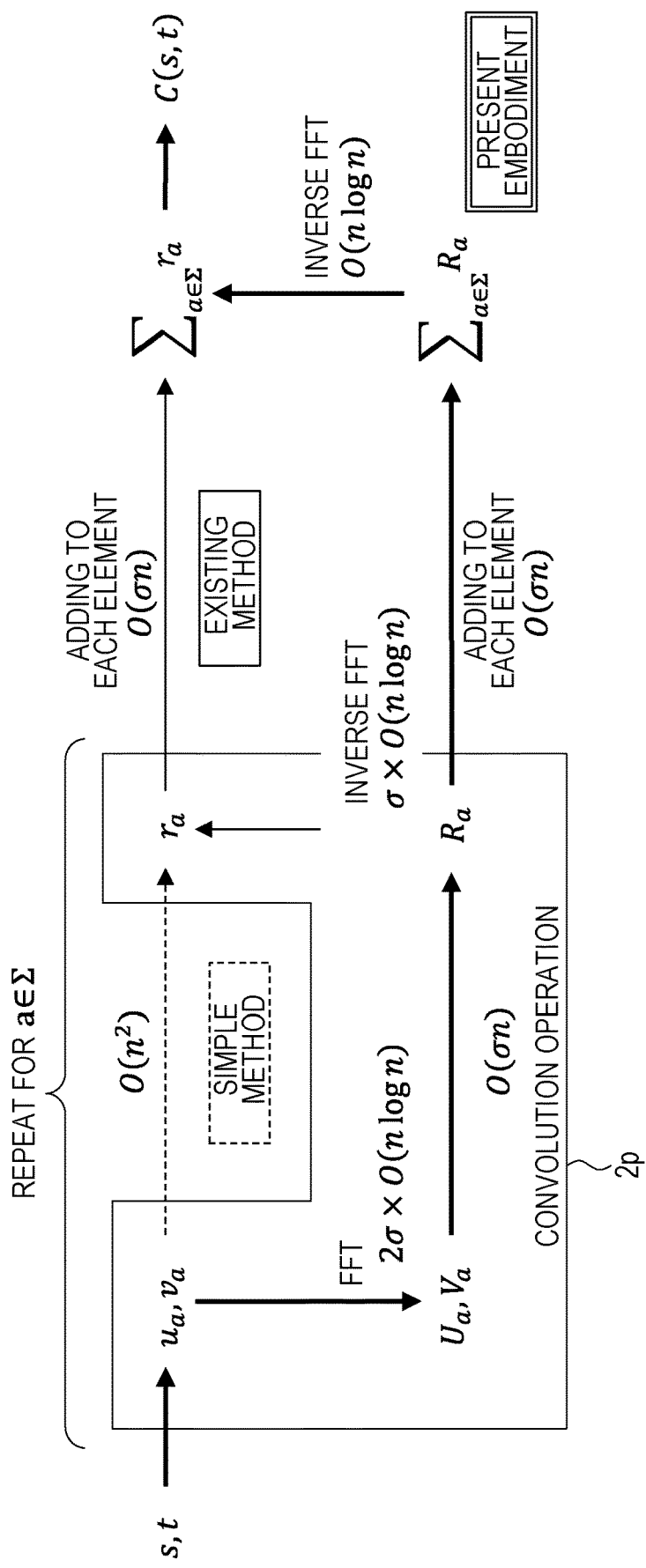
FIG. 22 is a diagram illustrating a conceptual diagram of a calculation method.

FIG. 22 is a diagram illustrating a conceptual diagram of a calculation method. In FIG. 22, a calculation part of a simple method that does not perform a convolution operation 2p and a convolution operation 2p is a part where processing is repeated for each element (kinds of word or character string) of the set Σ. That is, repetition is performed a number of times. Thereafter, values are summed for each element of the obtained a vectors, and the correlation c(s, t) between the document s and the document t is obtained.

In the related technique, in the convolution operation 2p, FFT calculation is performed 2σ times during discrete Fourier transform and is performed a times during inverse FFT, and thereby, the calculation is performed 36 times in total.

Meanwhile, in the present embodiment, addition is performed for each element of the vector in the convolution operation 2p before the inverse FFT is performed, the inverse FFT is performed for the results, and thereby, the number of calculations of the inverse FFT is reduced from a times to one time. In the present embodiment, the larger the σ, the better the effects are obtained, and it is possible to acquire correlation between two documents in approximately two-thirds time, compared with the related technique.

In addition, in a case where σ is small, correlation in each word may not obtain from the viewpoint of application, but in a case where a is large, even if correlation in a specific word is demanded, a large σ is considered as another word, and thus, the present embodiment is more appropriate from this point of view. The method of reducing the number of calculations of the inverse FFT described above from a times to one time for the convolution operation of FIG. 3B is based on the contents of Japanese Patent Application No. 2016-201933 and Japanese Patent Application No. 2016-229208 by the same applicant.

Figure 23:
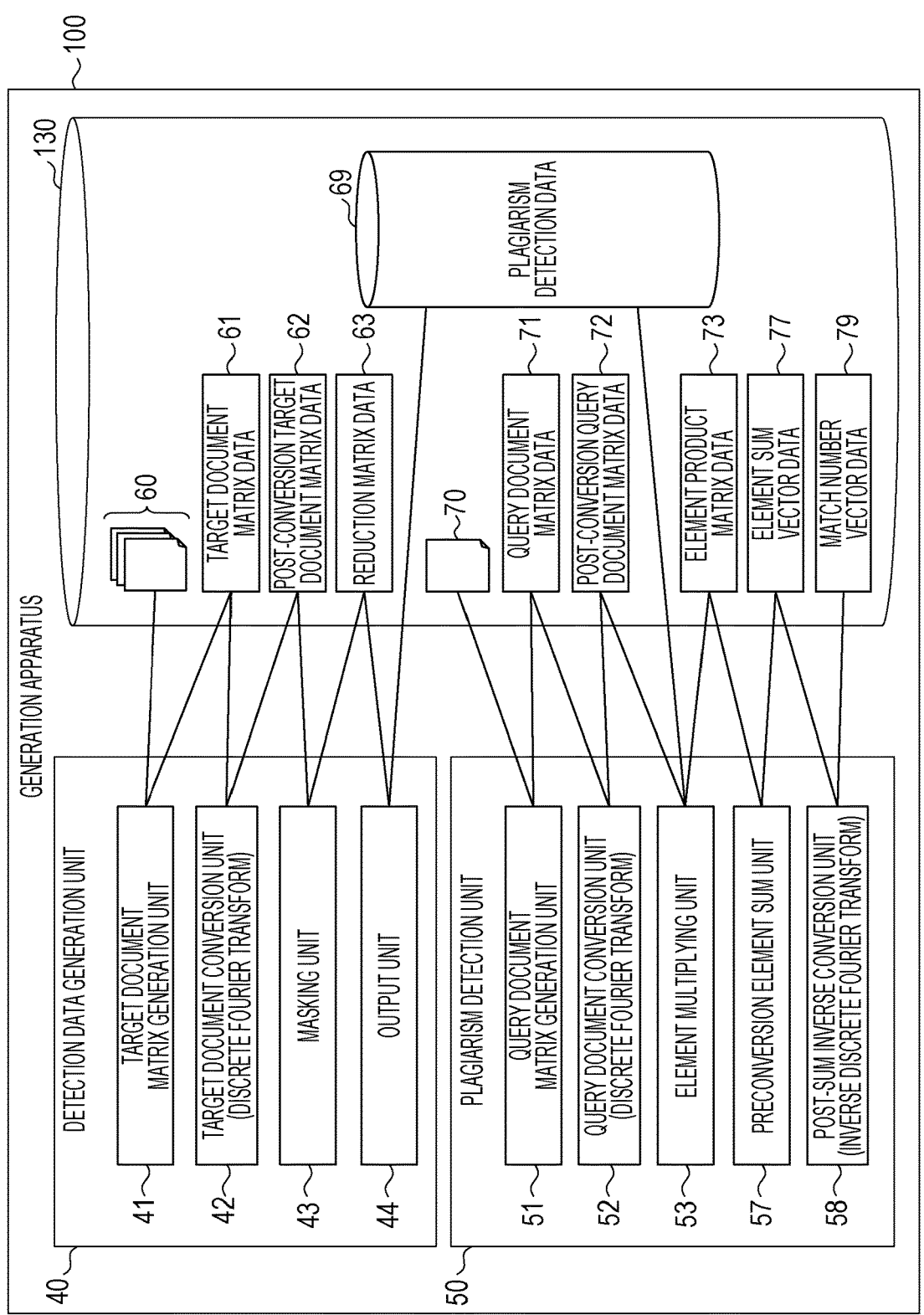
FIG. 23 is a diagram illustrating a third functional configuration example of the generation apparatus.

A third functional configuration example for reducing the number of calculations of the inverse FFT from σ times to one time will be described. FIG. 23 is a diagram illustrating a third functional configuration example of the generation apparatus. In FIG. 23, the generation apparatus 100 mainly includes the detection data generation unit 40 and a plagiarism detection unit 50-2. The storage unit 130 stores the element sum vector data 77 in addition to the target document 60, the target document matrix data 61, the post-conversion target document matrix data 62, the reduction matrix data 63, the plagiarism detection data 69, the query document 70, the query document matrix data 71, the post-conversion query document matrix data 72, the element product matrix data 73, the match number vector data 79, and the like in the first functional configuration. Since the functional configuration of the detection data generation unit 40 is the same as the detection data generation unit of the first functional configuration, description thereof will be omitted.

The plagiarism detection unit 50-2 is a processing unit that detects plagiarism using the plagiarism detection data 69 in response to a request to designate the query document 70 that determines whether or not a plagiarism portion from a user is included. The plagiarism detection unit 50-2 includes the query document matrix generation unit 51, the query document conversion unit 52, and the element multiplying unit 53 of the first functional configuration as a configuration for performing the inverse discrete Fourier transform at one time, but includes a pre-conversion element sum unit 57 and a post-sum inverse conversion unit 58 instead of the inverse conversion unit 54 and the element sum unit 59 of the first functional configuration. The query document matrix generation unit 51, the query document conversion unit 52, and the element multiplying unit 53 are the same as those of the first functional configuration, and thus, description thereof will be omitted.

The pre-conversion element sum unit 57 adds elements to the element product matrix data 73 representing product of elements of the post-conversion query document matrix data 72 and the plagiarism detection data 69, and generates the element sum vector data 77, for each row. The element sum vector data 77 is stored in the storage unit 130.

The post-sum inverse conversion unit 58 performs inverse discrete Fourier transform on the element sum vector data 77 to obtain the match number vector data 79. The match number vector data 79 is stored in the storage unit 130. The post-sum inverse conversion unit 58 may display the match number vector data 79 on the display device 15.

Figure 24A:
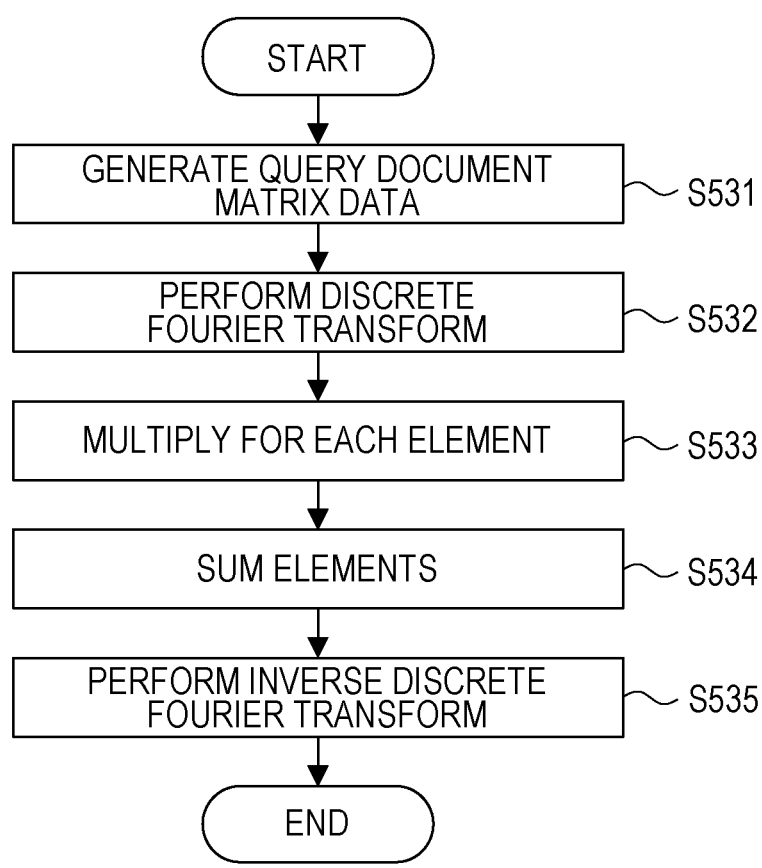
FIGS. 24A and 24B are diagrams illustrating a plagiarism detection processing of the third functional configuration example of FIG. 23.
Figure 24B:
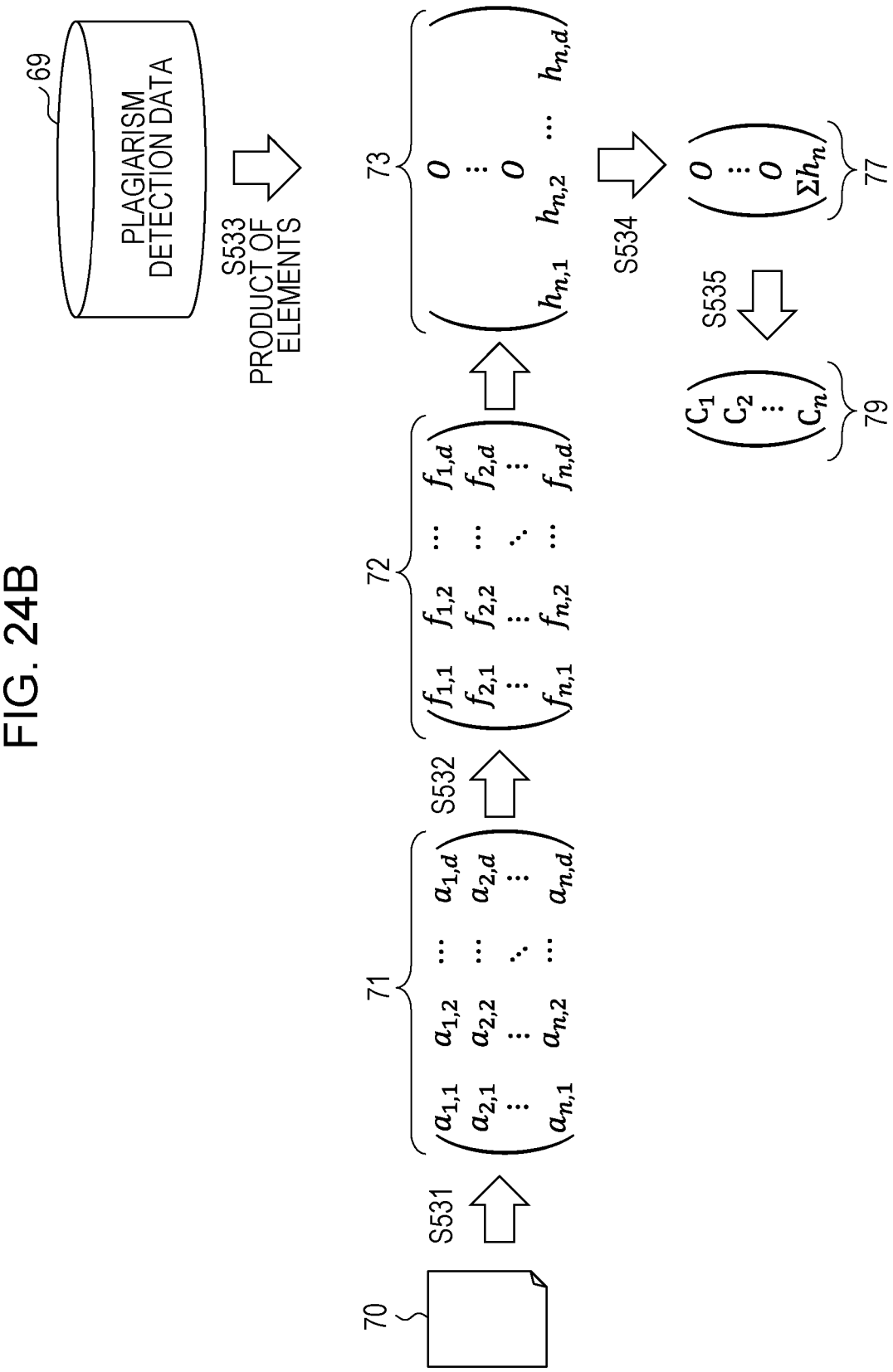

FIGS. 24A and 24B are diagrams illustrating plagiarism detection processing of the third functional configuration example illustrated in FIG. 23. FIG. 24A illustrates a flowchart, and FIG. 24B illustrates steps of the processing. In FIG. 24A, the plagiarism detection unit 50-2 performs steps S531 to S535 in response to a request to designate the query document 70 from a user, and outputs the match number vector data 79 representing the number of matching for each word.

In the plagiarism detection unit 50, the query document matrix generation unit 51 creates a vector for each word of the query document 70, and generates the query document matrix data 71 representing the query document 70 (step S531). The query document conversion unit 52 performs discrete Fourier transform on the query document matrix data 71 generated by the query document matrix generation unit 51 to obtain the post-conversion query matrix data 72 (step S532).

The element multiplying unit 53 multiplies each element by the post-conversion query matrix data 72 and the plagiarism detection data 69 and creates the element product matrix data 73 represented by product of elements (step S533). In the present embodiment, the element product matrix data 73 to be created represents a matrix in which a upper row is masked.

Then, the pre-conversion element sum unit 57 sums elements for each row of the element product matrix data 73 to obtain element sum vector data 77 (step S534). The element sum vector data 77 is stored in the storage unit 130.

The post-sum inverse conversion unit 58 performs inverse discrete Fourier transform on the element sum vector data 77 to obtain the match number vector data 79 (step S535). The inverse discrete Fourier transform performed by the post-sum inverse conversion unit 58 is performed only once. The match number vector data 79 is stored in the storage unit 130. The post-sum inverse conversion unit 58 may display the match number vector data 79 on the display device 15.

As described above, according to the present embodiment, it is possible to reduce the amount of data of the plagiarism detection data 69 by masking the upper row while holding low frequency components of a score vector that can be used for plagiarism detection.

In the above description, the reduction matrix 63*a* is an example of a detection matrix, the target document matrix 61*a* is an example of a numerical matrix, and the post-conversion target document matrix 62*a* is an example of a conversion matrix. In addition, the plagiarism detection data 69 is an example of data representing a detection matrix, the target document matrix data 61 is an example of data representing a numerical matrix, and the post-conversion target document matrix data 62 is an example of data representing a conversion matrix. Furthermore, the target document matrix generation unit 41 is an example of a conversion unit that converts the target document 60 into a matrix, and the target document conversion unit 42 is an example of a generation unit that generates a conversion matrix.

In addition, the query document matrix data 71 is an example of data representing a numerical matrix, the post-conversion query document matrix data 72 is an example of data representing a conversion matrix, and the element product matrix data 73 is an example of data representing an element product matrix. The match number vector data 79 is an example of data representing a vector relating to match between the target document 60 and the query document 70.

The present disclosure is not limited to the specifically disclosed embodiments, and various modifications and changes can be made without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a matrix generation program causing a computer to perform a process comprising:
    converting a target document into a numerical matrix;
    generating a conversion matrix by performing discrete Fourier transform on the numerical matrix;
    generating a detection matrix to be used for plagiarism detection by masking an upper row of the conversion matrix with 0; and
    storing the detection matrix in a memory for further process of plagiarism detection.

2. The storage medium according to claim 1, wherein the process further comprises:
    determining a range of the masking for the upper row in accordance with a size of the target document.

3. The storage medium according to claim 2, wherein the process further comprises:
    specifying a dimension number and a masking rate that do not exceed a magnification using a conditional formula which is represented by the dimension number of the target document, the masking rate, and the magnification in accordance with designation of the magnification for a size of the target document.

4. The storage medium according to claim 3, wherein the process further comprises:
    acquiring a data reduction rate by using a formula represented by a specified magnification and a reference dimension number; and
    acquiring a dimension that satisfies the acquired data reduction rate and plagiarism detection accuracy with reference to the experimental results, which are stored in a memory, representing a relationship between the data reduction rate and the plagiarism detection accuracy for each dimension.

5. The storage medium according to claim 1, wherein the process further comprises:
    determining a range of the masking for the upper row, based on designated plagiarism detection accuracy.

6. The storage medium according to claim 5, wherein the process further comprises:
    acquiring plagiarism detection accuracy corresponding to the designated plagiarism detection accuracy with reference to experimental results, which are stored in the memory, representing a relationship between a data reduction rate and plagiarism detection accuracy for each dimension.

7. The storage medium according to claim 6, wherein the process further comprises:
    acquiring a dimension and a data reduction rate which satisfy the designated plagiarism detection accuracy and are configured by a minimum magnification, from the experimental results, and acquiring a masking rate representing a range of the masking using the acquired dimension and data reduction rate, and a reference dimension number.

8. The storage medium according to claim 6, wherein the process further comprises:
    acquiring a dimension and a data reduction rate which are higher than or equal to the designated plagiarism detection accuracy and are configured by a maximum accuracy, from the experimental results, and acquiring a masking rate representing a range of the masking using the acquired dimension and data reduction rate, and a reference dimension number.

9. A matrix generation apparatus comprising:
    a memory,
    a processor coupled to the memory and configured to execute a process comprising:
    converting a target document into a numerical matrix;
    generating a conversion matrix by performing discrete Fourier transform on the numerical matrix;
    generating a detection matrix to be used for plagiarism detection by masking a upper row of the conversion matrix with 0; and
    storing the detection matrix in the memory for further process of plagiarism detection.

* * * * *